United States Patent
Cuzdey

(10) Patent No.: US 10,926,341 B2
(45) Date of Patent: Feb. 23, 2021

(54) CONVERTIBLE ZERO-CLEARANCE CIRCULAR SAW

(71) Applicant: Cuz-D Manufacturing, Inc., Tacoma, WA (US)

(72) Inventor: Jacob Cuzdey, Lacey, WA (US)

(73) Assignee: CUZ-D MANUFACTURING, INC., Tacoma, WA (US)

( * ) Notice: Subject to any disclaimer, the term of this patent is extended or adjusted under 35 U.S.C. 154(b) by 279 days.

(21) Appl. No.: 15/377,760

(22) Filed: Dec. 13, 2016

(65) Prior Publication Data

US 2017/0274463 A1  Sep. 28, 2017

Related U.S. Application Data

(63) Continuation of application No. 13/817,765, filed as application No. PCT/US2011/048323 on Aug. 18, 2011, now abandoned.

(60) Provisional application No. 61/401,814, filed on Aug. 18, 2010.

(51) Int. Cl.
| | |
|---|---|
| *B23D 45/16* | (2006.01) |
| *B27B 9/02* | (2006.01) |
| *B27B 5/08* | (2006.01) |
| *B23D 61/02* | (2006.01) |

(52) U.S. Cl.
CPC .......... *B23D 45/16* (2013.01); *B23D 61/025* (2013.01); *B27B 5/08* (2013.01); *B27B 9/02* (2013.01); *Y10T 83/9319* (2015.04)

(58) Field of Classification Search
CPC ...... B23D 45/16; B23D 45/165; B23D 61/00; B23D 61/02; B23D 61/023; B23D 61/025; B23D 61/026; B27B 5/00; B27B 5/02; B27B 5/08; B27B 29/00; B27B 29/02
See application file for complete search history.

(56) References Cited

U.S. PATENT DOCUMENTS

| | | | | |
|---|---|---|---|---|
| 245,090 | A | * 8/1881 | Northway | ............ B23D 61/121 83/848 |
| 1,830,580 | A | * 11/1931 | Wappat | ...................... B27B 9/02 30/376 |
| 1,833,785 | A | * 11/1931 | Krieger | ................ B23D 47/126 83/98 |
| 1,858,459 | A | * 5/1932 | Ramey | ...................... B27B 9/02 30/376 |
| 3,292,673 | A | * 12/1966 | Gregory | .................... B27B 5/38 30/377 |

(Continued)

*Primary Examiner* — Andrea L Wellington
*Assistant Examiner* — Richard D Crosby, Jr.

(57) ABSTRACT

A portable zero clearance circular saw including a motor frame portion with a transverse oriented drive shaft and arbor coupled to the drive shaft, a handle portion with a hand grip coupled to the motor frame portion aft end, a planar blade deck on a first lateral side, a movable blade shield rotatably mounted coaxial with the drive shaft and having a sidewall with a edge face coplanar with the blade deck, a trigger proximate the hand grip to move the blade shield, and a blade couplable to the drive shaft against the arbor, such that the blade outer surface is flush with the blade deck and blade shield sidewall. The handle portion may be rotatably coupled to the motor frame portion, and may include two laterally disposed blade shield triggers operably coupled to the blade shield via a dual pulley system.

2 Claims, 21 Drawing Sheets

(56) References Cited

U.S. PATENT DOCUMENTS

| | | | | |
|---|---|---|---|---|
| 3,578,043 | A * | 5/1971 | Menge | B23D 45/143 83/471.3 |
| 3,721,141 | A * | 3/1973 | Frostad | B27B 9/02 83/478 |
| 3,886,658 | A * | 6/1975 | Wikoff | B23D 45/16 30/388 |
| 4,406,064 | A * | 9/1983 | Goss | B27B 9/00 30/298.4 |
| 4,589,458 | A * | 5/1986 | McCord, Jr. | B23D 47/005 144/218 |
| 4,685,214 | A * | 8/1987 | Shearon | B27G 19/04 125/13.01 |
| 4,706,386 | A * | 11/1987 | Wiley | B23D 61/025 30/388 |
| 4,730,952 | A * | 3/1988 | Wiley | B24B 45/006 30/388 |
| 4,856,394 | A * | 8/1989 | Clowers | B23D 59/006 83/56 |
| 5,722,168 | A * | 3/1998 | Huang | B23D 51/01 30/160 |
| 5,758,425 | A * | 6/1998 | Gallagher | B27B 9/02 30/376 |
| 5,850,698 | A * | 12/1998 | Hurn | B23D 47/126 30/391 |
| 5,856,715 | A * | 1/1999 | Peot | B23D 45/16 30/388 |
| 6,269,543 | B1 * | 8/2001 | Ohkouchi | B23D 45/16 30/390 |
| D475,265 | S * | 6/2003 | Hatch | D8/66 |
| 6,739,060 | B1 * | 5/2004 | Huang | B27B 9/00 125/13.01 |
| 6,912,790 | B2 * | 7/2005 | James | B23D 51/01 30/392 |
| D587,979 | S * | 3/2009 | Jeiziner | D8/70 |
| 8,695,224 | B2 * | 4/2014 | Gehret | B23D 47/12 30/388 |
| D713,231 | S * | 9/2014 | Boozic | D8/70 |
| 8,898,913 | B1 * | 12/2014 | Lones | B23D 45/16 125/13.03 |
| 9,073,228 | B2 * | 7/2015 | Inayoshi | B26D 7/18 |
| 9,101,993 | B2 * | 8/2015 | Yokota | B23D 59/006 |
| 9,156,182 | B2 * | 10/2015 | Moreno | B23D 45/16 |
| D746,655 | S * | 1/2016 | Wackwitz | D8/70 |
| D789,759 | S * | 6/2017 | Fellmann | D8/70 |
| 9,937,638 | B2 * | 4/2018 | Numata | B28D 7/02 |
| D817,139 | S * | 5/2018 | Fellmann | D8/70 |
| 10,220,457 | B2 * | 3/2019 | Kume | B23D 45/16 |
| 2002/0046469 | A1 * | 4/2002 | DiLaura | B27C 1/14 30/388 |
| 2004/0060178 | A1 * | 4/2004 | Willer | B27B 9/00 30/391 |
| 2006/0112804 | A1 * | 6/2006 | Dils | B23D 45/044 83/581 |
| 2008/0148915 | A1 * | 6/2008 | Nickels | B27B 9/04 83/469 |
| 2008/0244910 | A1 * | 10/2008 | Patel | B23D 47/02 30/123 |
| 2008/0287049 | A1 * | 11/2008 | Salzgeber | B24D 5/16 451/548 |
| 2011/0185581 | A1 * | 8/2011 | Xing | B23D 45/16 30/374 |
| 2011/0214302 | A1 * | 9/2011 | Inayoshi | B25F 5/02 30/371 |
| 2011/0214547 | A1 * | 9/2011 | Inayoshi | B25F 5/02 83/508.2 |
| 2013/0047443 | A1 * | 2/2013 | Brown | B27G 19/04 30/277.4 |
| 2013/0081286 | A1 * | 4/2013 | Moreno | B23D 45/16 30/377 |
| 2015/0336287 | A1 * | 11/2015 | Brown | B25F 5/02 30/376 |

* cited by examiner

CONVERTIBLE ZERO-CLEARANCE CIRCULAR SAW

CROSS-REFERENCE TO RELATED APPLICATIONS

This application is a continuation of U.S. application Ser. No. 13/817,765 filed Feb. 19, 2013, which is a 371 national phase application of PCT/US2011/048323 filed Aug. 18, 2011, which claims priority to U.S. Provisional Application No. 61/401,814, filed Aug. 18, 2010.

FIELD OF THE INVENTION

The present invention relates to portable circular saws for zero-clearance or flush cutting, such as undercut saws.

BACKGROUND

Conventional portable circular saws are not capable of safely making flush cuts—i.e. zero clearance—against a planar surface. Conventional tools mount the saw blade using attachments which project outward beyond the outside blade face, and the blade guard extends at least partially over both blade faces, and no bearing surface, or "deck", is provided to support the saw against a first plane and the saw blade flush against a second plane. Conventional tools also use a fixed forward blade guard which is not adjustable, preventing the operator from inserting the saw by a front entry which provides superior visibility and control from "bucking", and prevents a smooth continuous transition through different cutting directions—e.g. cutting along a floor edge and then continuously upward along a door frame or wall corner. Additionally, conventional designs do not provide effective one-handed control of the movable blade guard, so operators are either required to use one hand to operate the trigger and their other hand to operate the blade guard—placing the operator's other hand close to the moving blade—or they bypass the safety feature by jamming something into the guard to hold it back—also quite dangerous (but unfortunately very common).

None of the conventional tool designs provides the ability to perform all of these functions in a safe and effective manner, nor are they able to convert between conventional circular saw and a flush cutting device. Conventional single-purpose tools have other disadvantages. Generally, they are unable to make deep cuts—e.g. through a double-deck comprising two or more layers of two-inch thick stacked boards—and provide limited angular adjustment to make beveled cuts.

A number of devices have provided an ability to perform undercutting. For example, Crain Tools™ produces a conventional "undercut saw", the model 820, capable of horizontal use to undercut along base boards and door jams. However, it is not useful for cutting vertical surfaces, lacking a deck, adjustable front guard and bevel adjustment, and is not suitable for 360° contour cutting. Additionally, jam saws lack controllable blade guards. Nor are conventional circular saws capable of conversion to a flush cutting tool. Conventional designs are (safely) capable merely of single purpose uses.

U.S. Pat. No. 5,481,806, to Pratt, is for a tongue attachment to a lower blade guard of a portable electric circular saw. During a cutting operation, that tongue attachment is intended to prevent binding or snagging of the leading edge of the lower blade guard on the nearest edge of a cut, bifurcated work. The saw disclosed therein is no more capable of making a zero clearance cut than any other portable electric circular saw.

U.S. Pat. No. 6,021,826 discloses a powered, chain saw cutting system for cutting mortises in a work for making mortise-and-tenon joints. Zero clearance cuts can be made with the system only in a manner that the nose end of system's saw bar and its entrained cutting chain is used to cut into a work piece in order to create a mortise therein. The apparatus lacks a blade deck bearing surface and adjustable base deck for use on vertical and horizontal through-cuts and the retractable flush blade shield.

U.S. Pat. No. 6,606,930 B2 discloses a saw cutting guide for a portable, electric, circular power saw that is intended as an aid in cutting the of the excess ends of roof shingles and the like. The disclosed saw cutting guide does nothing to permit a portable, circular power saw to achieve a zero clearance cut, and nothing in the disclosure would assist a person of ordinary skill to arrive at Applicant's invention. U.S. Patent Pub. 2004/0035274 A is similar.

U.S. Pat. No. 4,245,390 discloses a scoring attachment for a portable, electric, circular saw. The attachment attaches to a front end portion of a such portable saw and imposes a score upon a surface of a wood article aligned with the rotating, circular saw blade in order to reduce or eliminate splintering of the wood during the cutting operation. The reference does not teach solutions to the need for a zero clearance saw.

U.S. Pat. No. 6,568,088 B I discloses a wheel attachment for portable power cutting tools. The attachment mounts a pair of laterally spaced-apart roller wheels at a front end of portable, electric, circular power saw to reduce friction of movement of the saw over a work piece during a cutting operation. The wheels are placed all on the same side of the blade, but this is to enhance stability of the saw, not for achieving a zero clearance cut.

U.S. Patent Pub. No. US 2007/0137446 A I discloses a guide for a hand-held power tool, which can include a portable, electric, circular power saw. The guide is intended for making cross-cuts on a work. No modifications to a circular power are made or even suggested for achieving a zero clearance cut.

U.S. Pat. No. 5,121,545 discloses an improved base tilting mechanism for a portable, electric circular saw, which is said to improve stability of handling of the saw as well as more accurate cutting. No modifications to a circular power are made or even suggested for achieving a zero clearance cut.

U.S. Pat. No. 7,043,845 B2 discloses a trim attachment for a portable, electric circular saw that provides a fence for cutting accurate trims of a desired thickness and substantial length from common elongated wood stock. The reference teaches only a conventional circular saw with an attachment, but does not disclose a saw capable of flush cutting.

Thus, there is a need circular saw that: (1) is portable; (2) provides zero clearance cutting capability; (3) provides continuous 360° cutting capability; (4) provides one-handed trigger and guard control using either hand; (5) is adjustable for bevel cutting; (6) provides near-instantaneous stopping of the blade; (7) can safely make deep cuts through multiple layers of lumber; (8) provide ability to convert between conventional circular saw arrangement and a zero clearance circular saw arrangement.

SUMMARY AND ADVANTAGES

A convertible zero clearance circular saw includes a motor frame portion having a motor coupled to a drive shaft; a handle portion coupled to the aft end of the motor frame portion, the handle portion including a hand grip, motor actuator on the hand grip, and one or two lower blade shield triggers proximate the hand grip to be operable by an operator's thumb; a blade deck planar bearing surface and circular cutting blade mounted to be flush with the blade deck planar bearing surface; a lower blade shield movable between a deployed position and a retracted position, disposed between the blade and motor frame portion, the blade shield including an arcuate sidewall partially circumscribing the blade cutting edge and having an edge face coplanar with the blade deck planar bearing surface; a base deck pivotable about a transverse axis and a longitudinal axis; and a front deck portion coupled to the front end of the base deck to move between a flat deployed position and a perpendicular position. The handle may be rotatingly coupled to the motor frame portion to lock at least at 0 degrees and 90 degrees. The saw may include a removable dust cover, articulated to adapted to the saw movements. The saw may include an offset blade or a flat blade with countersunk and beveled connections. The blade shield triggers may be operable independently from each other. The lower blade shield may be operably coupled to the blade shield triggers through a double pulley of dissimilar diameter sheaves. The saw may include an electromagnetic brake for near instantaneous stopping of the blade. The saw may convert to mount a standard flat blade as well.

The convertible zero clearance circular saw of the present invention presents numerous advantages, including: (1) 360 degree flush cutting against a planar surface; (2) usable as a vertical cutter or a undercut saw; (3) a remotely operated blade shield so that operators do not place their fingers near the moving blade; (4) provides greater bevel and pitch/depth adjustment than standard saws; (5) may be used as a standard circular saw or a plunge cut saw; (6) provides instantaneous braking of the blade for safety; (7) provides easy access to motor internals for maintenance; (8) independently operable blade shield triggers do not interfere with the operator's hand grip; (9) provides for ambidextrous operation; (10) allows for use of a dust cover; (11) may include a pulley-operated blade shield system which reduces wear and likelihood of binding.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

REFERENCE NUMBERS USED IN DRAWINGS

Figure 1:
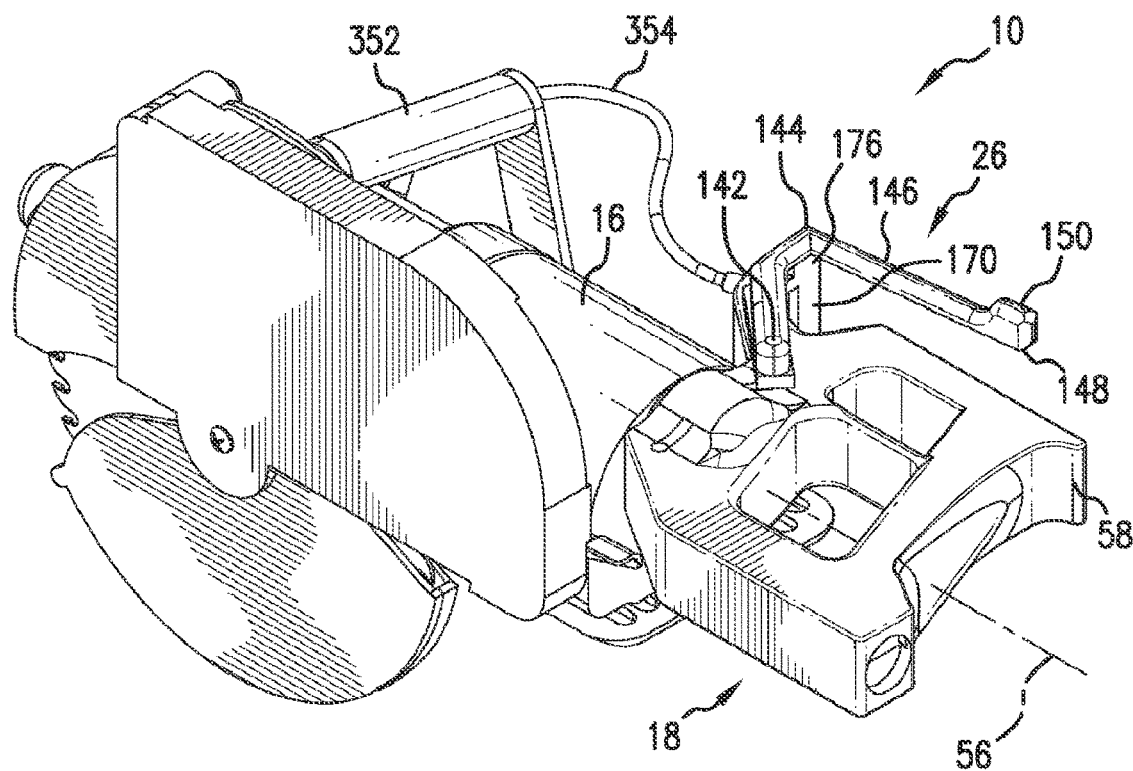
FIG. 1 shows a perspective view of a first embodiment with rotated handle portion at 90 degrees and dust cover installed.

Turning now descriptively to the drawings, in which similar reference characters denote similar elements throughout the several views, the figures illustrate the of the present invention. With regard to the reference numerals used, the following numbering is used throughout the various drawing figures:
10 First embodiment
12 Saw forward end
14 Saw aft end
16 Motor frame portion
18 Handle portion 20 Blade deck
22 Base deck
24 Lower blade shield
26 First lower blade shield trigger
28 Arbor
30 Motor frame portion forward end
32 Motor frame portion aft end
34 Motor
36 Drive shaft
38 Motor frame portion first lateral side
40 First transverse axis
42 Electrical cord
44 Lower blade shield axle
46 First mounting face
48 Circular saw blade
50 Blade arc
52 Blade teeth tips
54 Worm reduction gear
56 Second longitudinal axis
58 Hand grip
60 Motor actuator
62 Electromagnetic brake
64 Blade deck planar bearing surface
66 Blade offset depth
68 Base deck forward edge
70 Base deck aft edge
72 Base deck first lateral edge
74 Base deck second lateral edge
76 Base deck planar bearing surface
78 Second transverse axis
80 First longitudinal axis
82 Base deck cut-out
84 Lower blade shield journal bearing
86 Lower blade shield journal bearing frustum
88 Base deck stiffening ribs
90 Base deck back side
92 Blade shield sidewall
94 Sidewall first end
96 Sidewall second end
98 Sidewall facing edge
100 Lower blade shield front side
102 Lower blade shield back side
104 Lower blade shield internal journal bearing surface
106 Lower blade shield external sheave
108 Second cable pulley
110 Second cable pulley terminal end
112 Lower blade shield anchor block
114 Lower blade shield bias spring
116 Lower blade shield bias spring first end
118 Lower blade shield bias spring second end
120
122 Drive shaft diameter
124 Blade shield axle exterior bearing surface
126 Blade shield axle exterior diameter
128 Blade shield axle interior bearing surface
130 Blade shield axle interior diameter
132 Arbor first part
134 Arbor first part hollow axle
136 Arbor second part
138 Arbor second part flange
140 First shield trigger first leg
142 First shield trigger first leg first end
144 First shield trigger first leg second end
146 First shield trigger second leg
148 First shield trigger second leg second end
150 First shield trigger finger tab
152 Handle portion first lateral side
154 Second lower blade shield trigger
156 Handle portion second lateral side
158 Second shield trigger first leg
160 Second shield trigger first leg first end
162 Second shield trigger first leg second end
164 Second shield trigger second leg
166 Second shield trigger second leg second end
168 Second shield trigger finger tab
170 Center lever bridge portion
172 Center lever first leg
174 Center lever second leg
176 Bridge portion first end
178 Bridge portion second end
180 Bridge portion first leg end
182 Bridge portion second leg end
184 Bridge portion first tab
186 Bridge portion second tab
188 Sixth transverse axis
190 Double pulley
192 Fifth transverse axis
194 Double pulley first sheave
196 First sheave diameter
198 Double pulley second sheave
200 Second sheave diameter
202 Center lever
204 First cable
206 First lower blade shield trigger pivot axle
208 Second lower blade shield trigger pivot axle
210 Second cable first end
212 Second cable second end
214 First cable first end
216 First cable second end
218 Blade central mounting portion
220 Central mounting portion first surface
222 Central mounting portion second surface
224 Second mounting face
226 Blade cutting portion
228 Blade cutting portion first planar surface
230 Blade cutting portion second planar surface
232 Blade cutting edge
234 Blade perimeter
236 Motor brush access port
238 Blade deck first aperture
240 Dust cover
242 Exhaust port
244 Aft cover portion
246 Lower blade cover portion
248 Front cover portion
250 Dust cover rotatable coupling connector
252 Hinge block
254 Dual axes coupler
256 Hinge block first end
258 Hinge block second end
260 Base deck hinge block longitudinal pivot coupling
262 Blade deck forward end
264 Hinge block second transverse hinge coupling
266 Dual axes hinge coupler
268 Dual axes hinge coupler first portion
270 Dual axes hinge coupler longitudinal hinge coupling
272 Dual axes hinge coupler second portion
274 Dual axes hinge coupler transverse hinge coupling
276 Fourth transverse axis
278 First sliding connector
280 First arcuate track
282 First arcuate track first end
284 First arcuate track second end
286 First closed channel 288 Stub axle
290 Stub axle base
292 Stub axle free end
294 First sliding connector first compression coupling
296 Second sliding connector
298 Second sliding connector first arcuate portion
300 Second sliding connector second arcuate portion
302 First arcuate portion first end
304 First arcuate portion second end
306 Second arcuate portion first end
308 Second arcuate portion second end
310 Second sliding connector compression coupling
312 Second closed channel
314 Blade deck interior edge
316 Blade gap
318 Blade base cutting depth
320 Blade plunge cutting depth
322 Front deck portion
324 Front deck portion forward edge
326 Front deck portion aft edge
328 Front deck portion planar bearing surface
330 Third transverse axis
332 Front deck portion locking pin
334 Front deck portion hinge joint
336 Front deck portion aperture
338 Arbor cap
340 Blade engagement projection
342 Center mounting aperture
344 Arbor cap flange
346 Arbor cap center aperture
348 Arbor cap center fasterner
350 Arbor cap depth
352 Second hand grip
354 Cable sheath
356 Dust cover lower blade cover portion snap fitting
358 Dust cover lower blade cover portion sidewall
360 Dust cover lower blade cover portion sidewall edge face
362 Handle portion male locking portion
364 Motor frame portion female locking portion
1010 Second Embodiment
1028 Arbor
1360 Arbor fastener receiving holes
1362 First plurality of mounting apertures
1364 Countersunk bevels
1366 Bevel head fasteners
1368 Fastener heads
1370 Second plurality of mounting apertures
1372 Countersunk bevels

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation—specific decisions must be made in order to achieve the developer's specific goals, such as compliance with application—and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Referring to FIGS. 1-33, a first embodiment of a zero clearance circular saw 10 is shown, having opposed forward and aft ends 12 and 14, respectively, which define the longitudinal forward-aft direction, and including a motor frame portion 16, a handle portion 18, a blade deck 20, a base deck 22, a lower blade shield 24, and a first lower blade shield trigger 26. In this Specification, "longitudinal" refers generally to an axis or orientation parallel to the forward—aft axis of the saw 10, and "transverse" refers generally to an axis or orientation extending perpendicular to the longitudinal direction.

Motor frame portion 16 includes opposed forward and aft ends 30 and 32, respectively, a motor 34 mounted to motor frame portion 16 operably coupled to drive shaft 36 projecting from a first lateral side 38 of the motor frame portion 16, the drive shaft defining a first transverse axis 40. In the embodiment, motor 34 is connectable to a power source via electrical cord 42. Alternatively, motor 34 could be powered by batteries, fuel cells, internal combustion engine, or other power sources or combination thereof. Arbor 28 is coupled to drive shaft 36 and includes a first mounting face 46 adapted to mate to a second mounting face 224 of a circular saw blade 48. In the embodiment, arbor 28 is a separable from drive shaft 36, but may be integral to drive shaft 36 as well. The rotation of rotary blade 48 mounted to saw 10 defines a blade arc 50, equating to the perimeter traced by the teeth tips 52 of blade 48. In practice, blade arc 50 will have a range of diameters based on the size of the saw blade 48 selected. In the embodiment motor 34 is mounted longitudinally, but could be mounted transversely as well. In the embodiment, drive shaft 36 is coupled to motor 34 through a reduction-worm gear 54, but other configurations may be used, including by way of example, a transverse engine mounting eliminating the worm gear, or a direct coupling to motor 34 without reduction gears.

Figure 2:
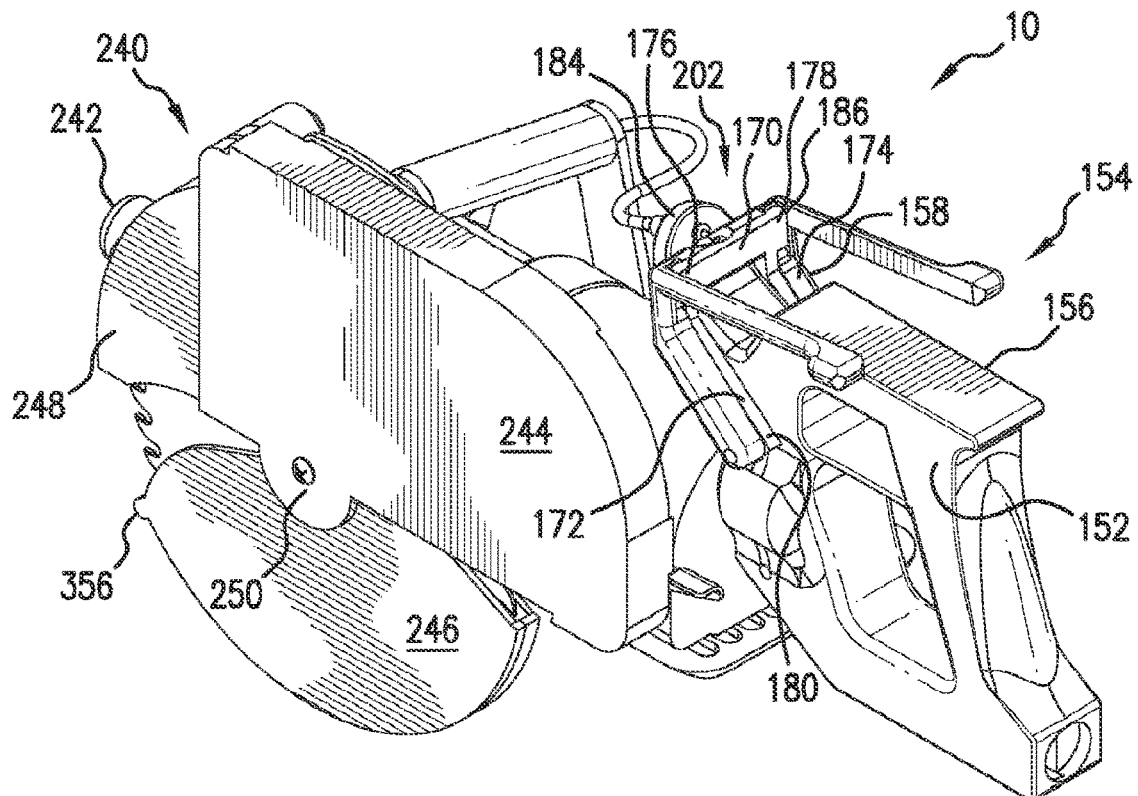
FIG. 2 shows a perspective view of a first embodiment with handle portion at 0 degrees and dust cover installed.
Figure 5:
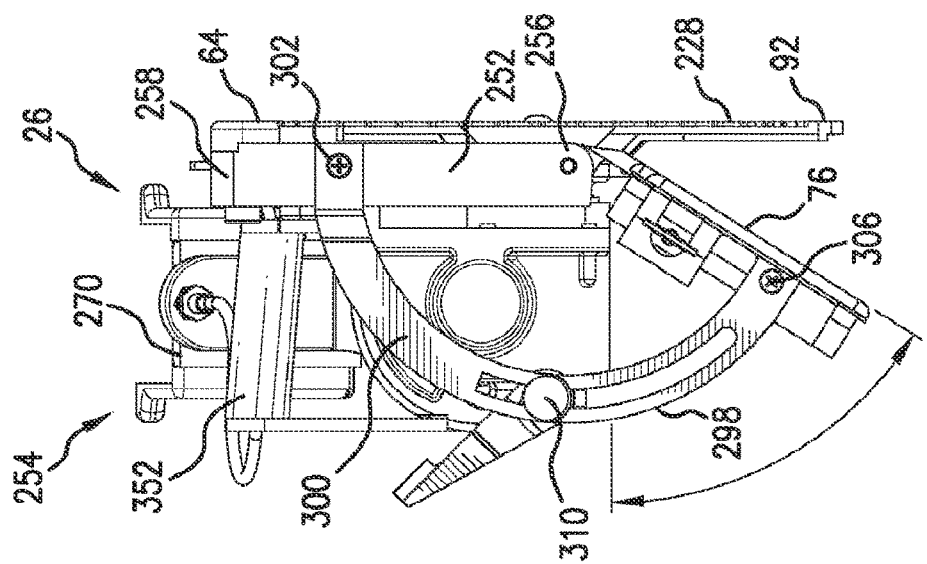
FIG. 5 shows a front view of a first embodiment with positive bevel.
Figure 4:
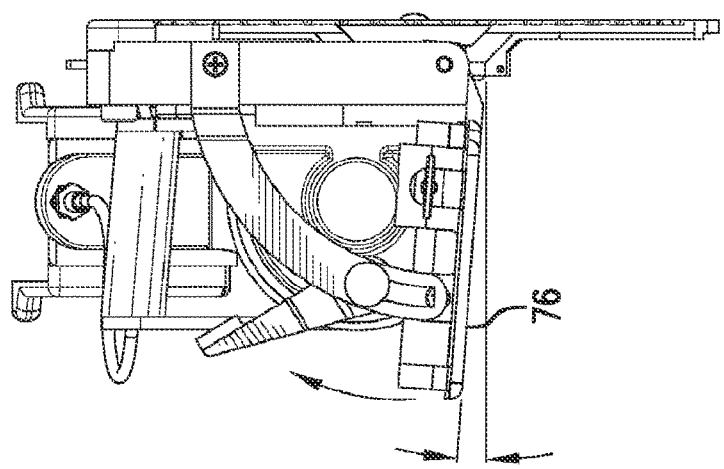
FIG. 4 shows a front view of a first embodiment with negative bevel.
Figure 3:
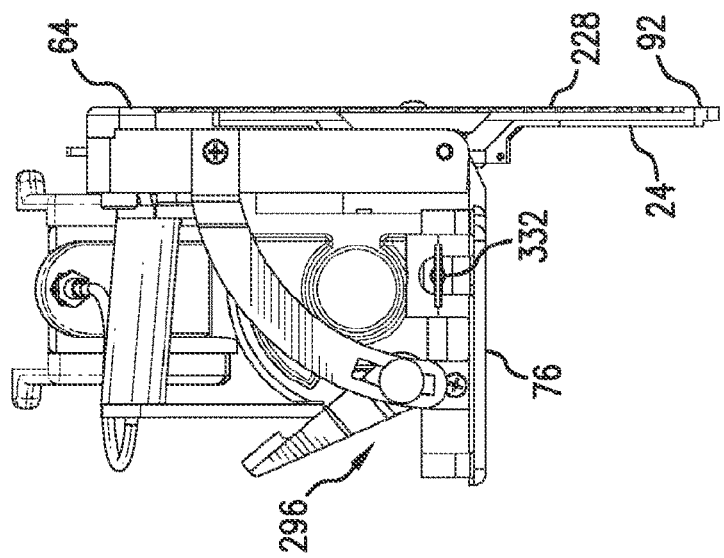
FIG. 3 shows a front view of a first embodiment with 0 degrees bevel.
Figure 6:
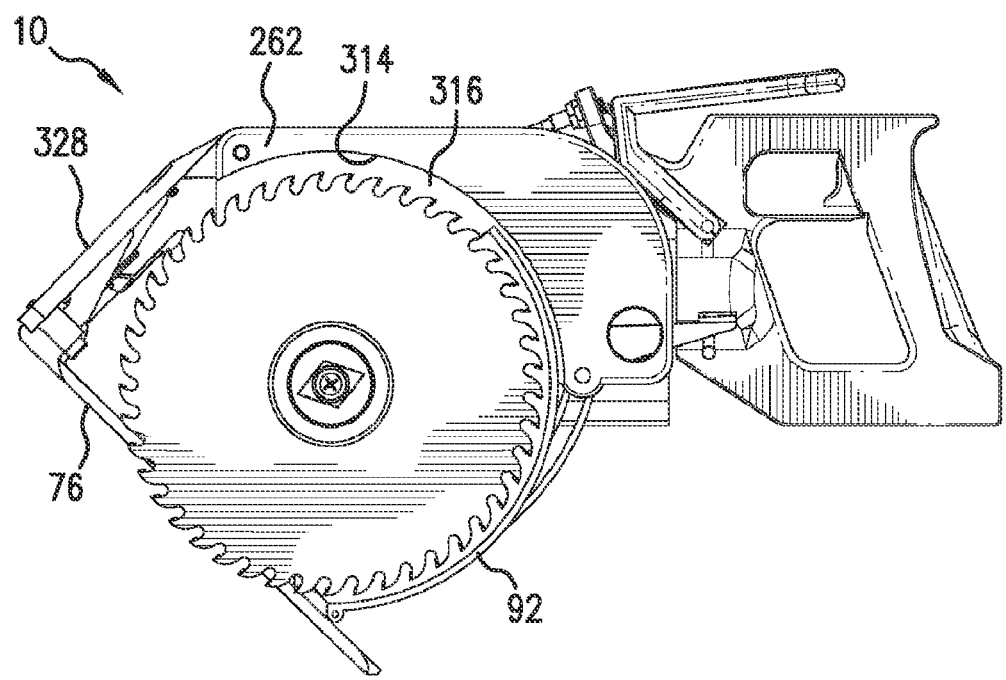
FIG. 6 shows a left side view of a first embodiment with positive pitch angle, front deck portion retracted.
Figure 7:
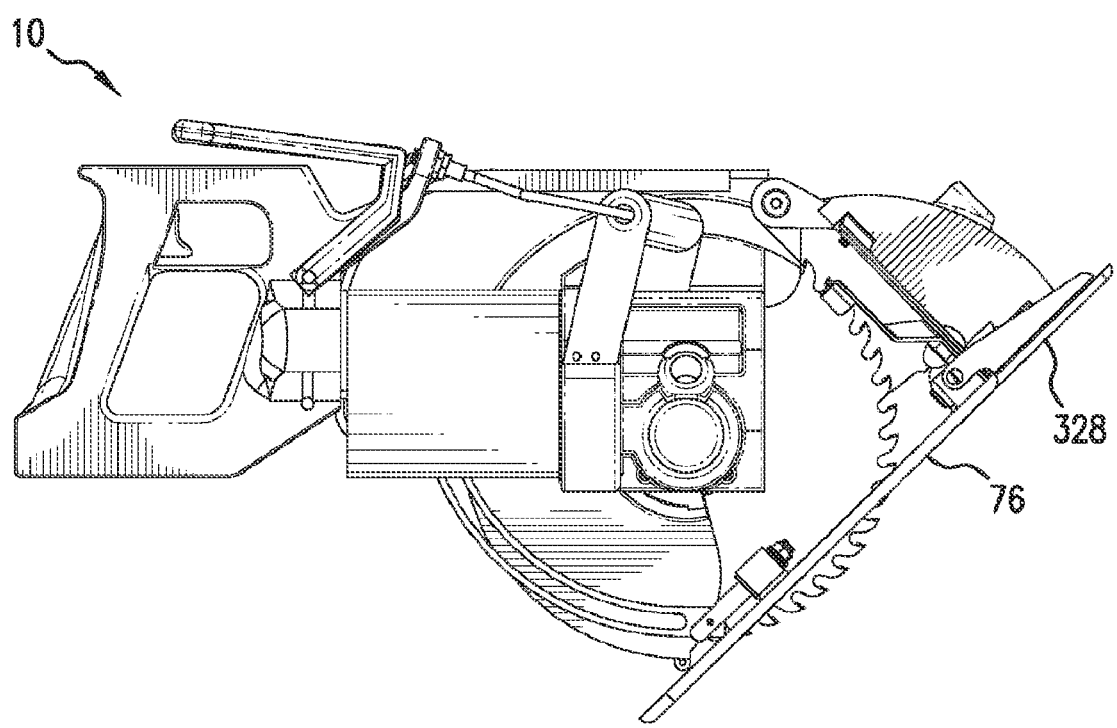
FIG. 7 shows a right side view of a first embodiment with positive pitch angle, dust cover installed, front deck portion extended.
Figure 8:
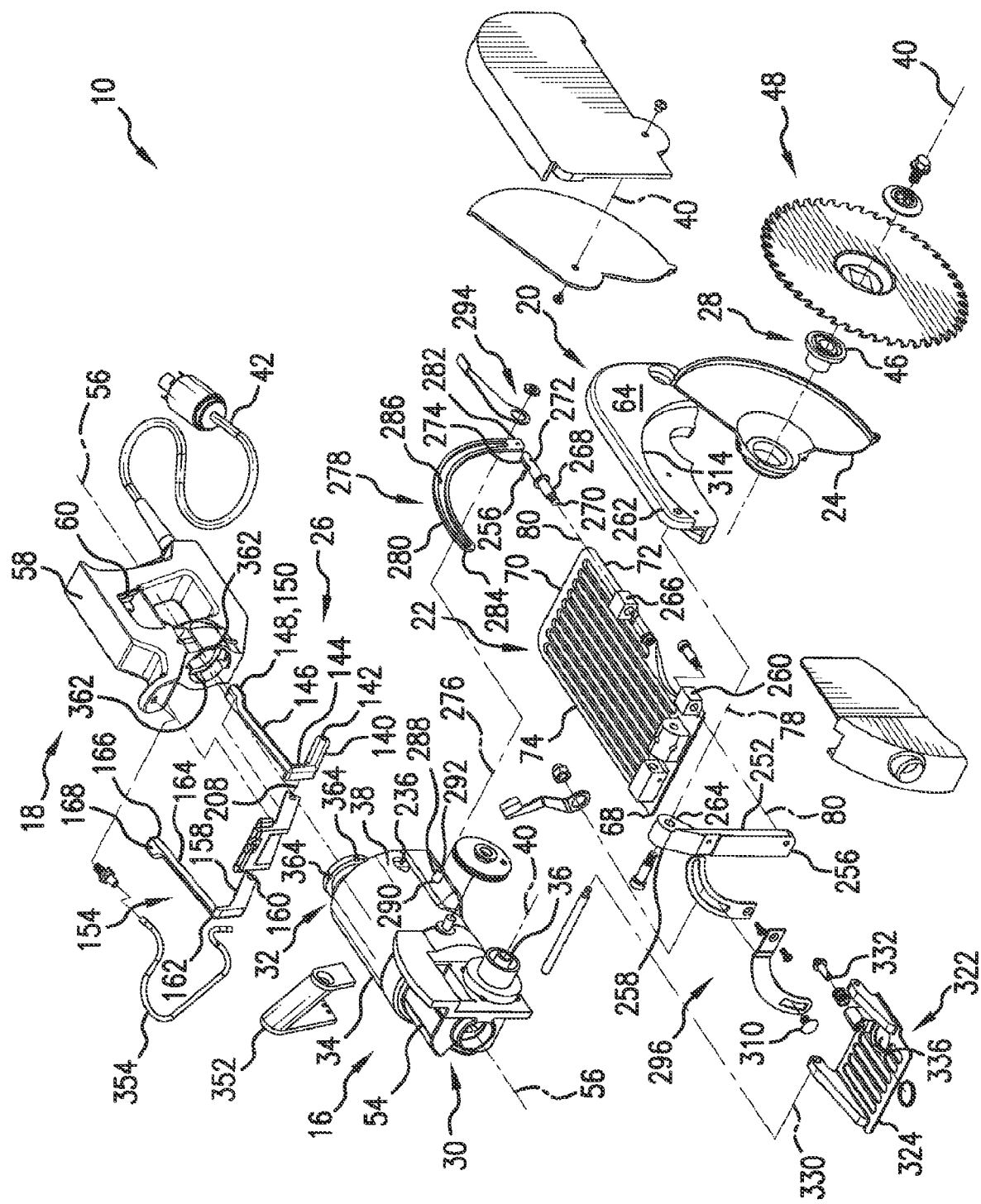
FIG. 8 shows an exploded view of a first embodiment.
Figure 9:
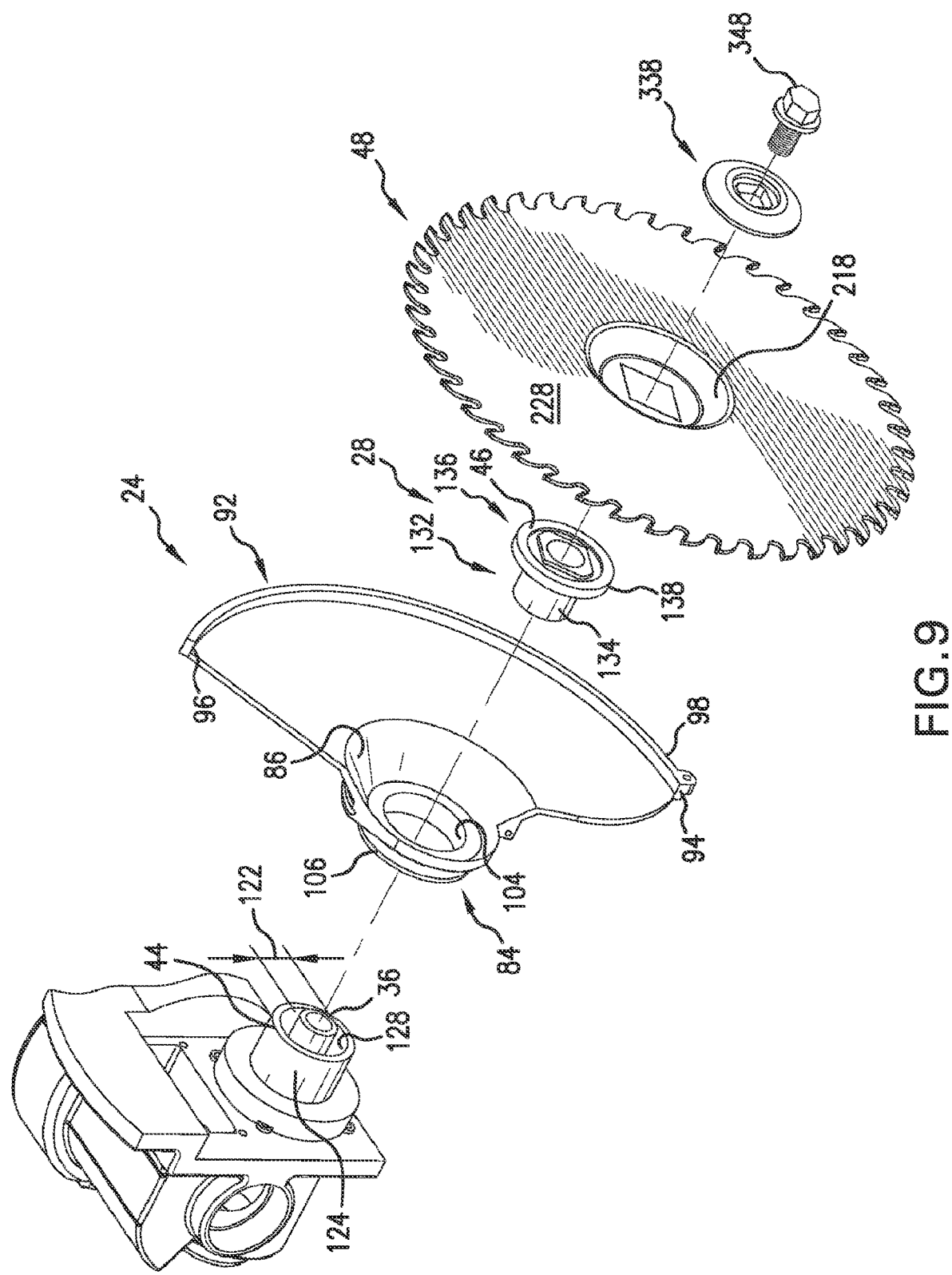
FIG. 9 shows an exploded close up view of a drive shaft and blade assembly.
Figure 10:
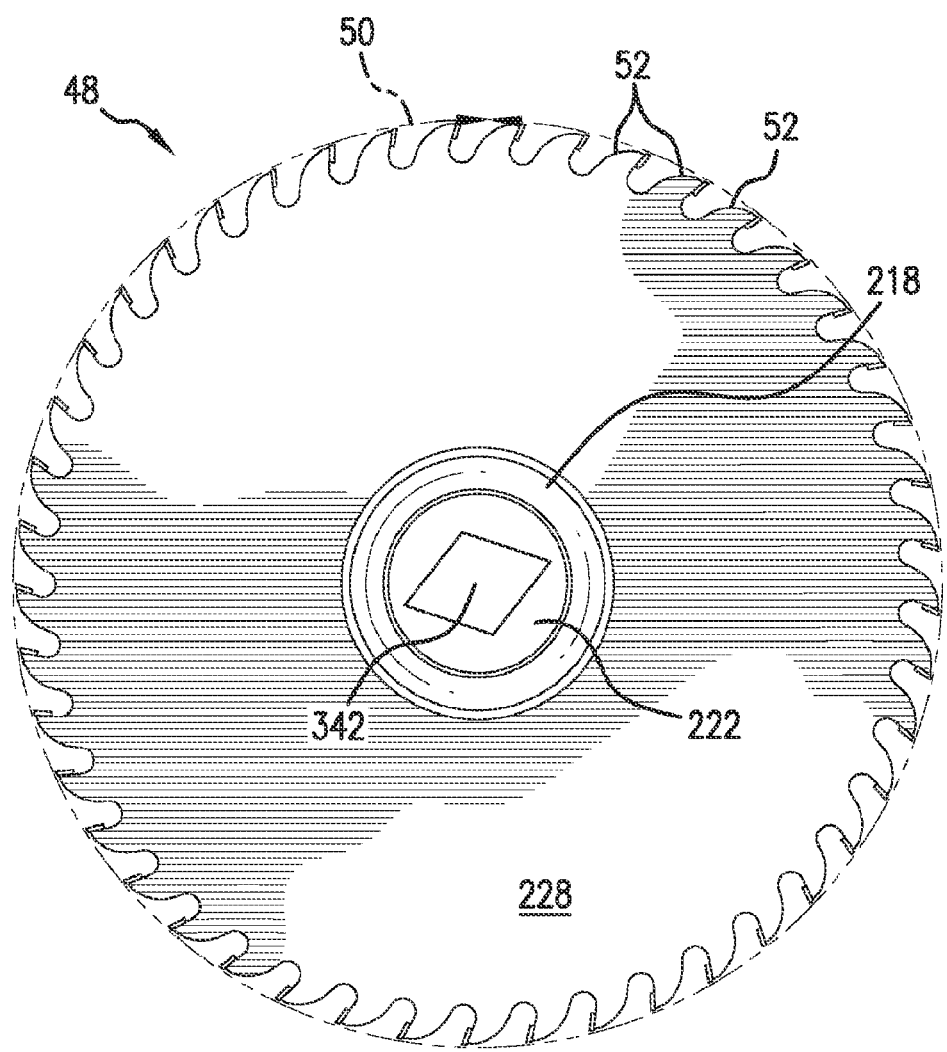
FIG. 10 shows a plan view of an offset blade.
Figure 11:
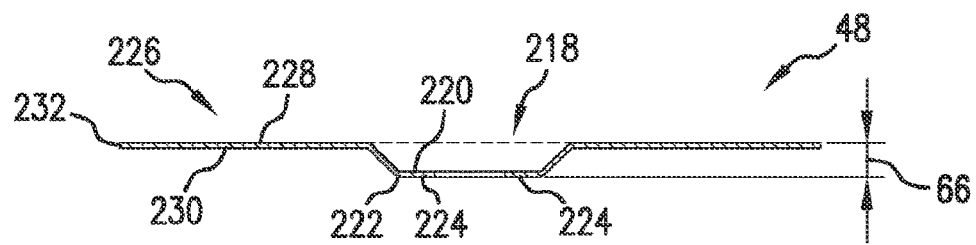
FIG. 11 shows a cutaway side view of an offset blade.
Figure 12:
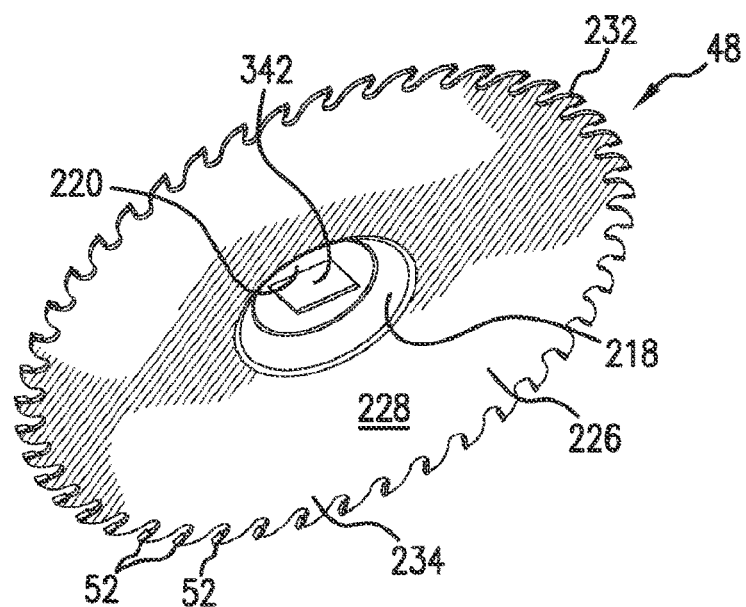
FIG. 12 shows perspective view of an offset blade.

Referring again to FIGS. 1, 2, 8 and 28, handle portion 18 is rotatably coupled to motor frame portion 16 at its aft end 32 so as to rotate about a second longitudinal axis 56. As seen in FIGS. 1 and 2, handle portion 18 is lockable at a plurality of user selected rotated positions, including at least 0° and 90° relative to motor frame portion 16. An operator may simply compress handle portion male locking members 362 to disengage from motor frame portion female locking portions 364, rotate the handle portion 18 until the male locking portions 362 snap into the female locking portions 364 again at the new position, and the saw is ready. Handle portion 18 includes hand grip 58, and finger operable motor actuator 60 to selectively actuate motor 34. In this regard, 90° may refer to clockwise or counterclockwise rotation, depending on whether the saw 10 is intended primarily for right-handed or left-handed operation, so 90° refers to the direction away from the motor frame portion first lateral side 38 where the saw blade would be mounted and 0° indicates handle portion 18 is aligned with hand grip 58 oriented parallel to blade arc 50.

In the embodiment, depressing motor actuator 60 activates motor 34 at full speed and releasing motor trigger 60 activates electromagnetic brake 62 to instantly and completely stop rotation of drive shaft 36 and blade 48. In the embodiment, electromagnetic brake 62 operates by applying DC current to the windings of motor 34, which is a permanent magnet AC motor in the embodiment, to lock the motor in place.

Blade deck 20 is rigidly coupled to motor frame portion 16 on the motor frame portion 16 first lateral side 38. Blade deck 20 includes a planar bearing surface 64 parallel to arbor first mounting face 46. The distance from first mounting face 46 to blade deck bearing surface 64 defines the blade offset depth 66. In the embodiment, motor 34 includes a first brush access port 236 on the motor frame portion first lateral side, and blade deck 20 includes a first aperture 238 aligned with the first brush access port 236 to provide access to an internal motor brush (not shown).

In the embodiment, blade deck 20 extends forward to blade deck forward end 262 so that blade deck bearing surface 64 extends forward to circumscribe a portion of blade arc 50, thereby defining a blade deck interior edge 314, the radial distance between the blade arc 50 and the blade deck interior edge 314 defining a blade gap 316 to receive at least a portion of the lower blade shield sidewall 92 in the retracted position.

Base deck 22 extends longitudinally from forward edge 68 to opposed aft edge 70 and transversely from first lateral edge 72 proximal to motor frame portion first lateral side 38 to second lateral edge 74, the base deck edges 68, 70, 72, 74 defining planar bearing surface 76. Base deck 22 is pivotally coupled to motor frame portion 16 about second transverse axis 78 and lockable at a plurality of user selectable pitch angles about second transverse axis 78 to adjust the blade base cutting depth 318 and plunge cutting depth 320, Base deck 22 is also pivotally coupled to motor frame portion 16 about first longitudinal axis 80 and lockable at a plurality of user selected bevel angles about first longitudinal axis 80. As seen in FIGS. 3-5, 8 and 22-23, in the embodiment, the bevel angle is continuously adjustable within a range from approximately −10° to approximately +65°, where the base deck bearing surface 76 normal to the blade arc 50 defines 0° (see FIG. 3). Positive bevel angle is defined as base deck 22 pivoted toward the exposed cutting portion of blade 48 (see FIG. 5), and negative bevel angle is defined as base deck 22 pivoted away from the exposed cutting portion of blade 48 (see FIG. 4).

First lateral edge 72 is substantially parallel to the blade arc 50 and first longitudinal axis 80. In the embodiment, base deck 22 includes a cut-out 82 along its first lateral edge 72 to provide clearance around lower blade shield journal bearing portion 84 and frustum 86, as base deck 22 is pivoted about first longitudinal axis 80 to adjust the bevel angle. In the embodiment, other than cutout 82 the base deck first lateral edge 72 forms a straight edge proximate blade arc 50 and first longitudinal axis 80, and so is described as "substantially" parallel. In the embodiment, base deck 22 includes a plurality of longitudinal stiffening ribs 88 along the back side 90, the back side 90 being the opposed side from bearing surface 76.

In the embodiment, base deck 22 is coupled to motor frame portion 16 by a forward mounted hinge block 252 and aft mounted dual axes coupler 254. Hinge block 252 has a first end 256 and opposed second end 258. Hinge block first end 256 is pivotally coupled to base deck 22 by longitudinal pivot coupling 260 mounted to base deck 22 distal from base deck aft edge 70 along first longitudinal axis 80 to pivot base deck 22 around first longitudinal axis 80, thereby adjusting the bevel angle. Hinge block second end 258 is pivotally coupled to motor frame portion 16 at second transverse axis 78 to pivot base deck 22 around second transverse axis 78. In the embodiment, hinge block second end 258 is directly coupled to blade deck 20 proximal blade deck forward end 262 by transverse hinge coupling 264, and blade deck 20 is rigidly coupled to motor frame portion 16, thereby coupling hinge block second end 258 to motor frame portion 16. Hinge block second end 258 could also be directly coupled to motor frame portion 16—the effect is the same. Dual axes hinge coupler 266 is mounted to base deck 22 proximate base deck first lateral edge 72 distal from base deck front edge 68. Dual axes hinge coupler 266 has first portion 268 including longitudinal hinge coupling 270 aligned along the first longitudinal axis 80 to pivot base deck 22 around first longitudinal axis 80, and a second portion 272 including transverse hinge coupling 274 aligned along fourth transverse axis 276.

In the embodiment, first sliding connector 278 couples between dual axes hinge coupler 266 and motor frame portion 16 to selectively set pitch angle controlling base cutting depth and plunge cutting depth. First sliding connector 278 includes first arcuate track 280 having first end 282, second end 284, and first closed channel 286 extending from proximate first end 282 to second end 284. First end 282 is coupled to dual axes hinge coupler second portion 272. First closed channel 286 slidlingly receives stub axle 288 there through. Stub axle 288 extends from a base 290 connected to motor frame portion first lateral side 38 to free end 292. Stub axle 288 extends through first closed channel 286 and has first selectively releasable compression coupling 294 coupled to stub axle 288 to lockingly engage against first arcuate track 280 and motor frame portion 16.

In the embodiment, a second sliding connector 296 couples between base deck 22 and hinge block 252 to selectively set bevel angle. Second sliding connector 296 includes overlapping first and second arcuate portions 298 and 300, respectively, selectively lockingly coupled by second compression coupler 310. First arcuate portion 298 has a first end 302 coupled to hinge block 252 distal from hinge block first end 256, and a second end 304. Second arcuate portion 300 has a first end 306 coupled to base deck 22 distal from base deck aft edge 70 and distal from base deck first lateral edge 72, and extends to a second end 308, with a second closed channel 312 extending from proximate first end 306 to second end 308. Second selectively releasable compression coupling 310 selectively lockingly engages first and second arcuate portions 298 and 300 against each other to set the bevel angle.

Compression fasteners 310 and 294 include finger levers for easy and quick loosening and tightening.

In first embodiment, a front deck portion 322 movable between a first extended position (shown in FIGS. 7, 25) and a second retracted position (shown in FIGS. 6, 24) is provided to permit accurate plunge cutting and the ability to cut along a 360° path around a planar surface. Front deck portion 322 has opposed forward and aft edges 324 and 326, respectively, and a planar bearing surface 328 extending there between. Front deck portion 322 is hingedly coupled proximate front deck portion aft edge 326 to base deck 22 proximate base deck front edge 68, and is pivotable about third transverse axis 330. Front deck portion 322 is lockable at least at a first position (shown in FIG. xxx), wherein front deck planar bearing surface 328 is coplanar to base deck planar bearing surface 76, and wherein front deck portion forward edge 324 extends forward of blade arc 50, and a second position (shown in FIG. xxx), wherein front deck portion planar bearing surface 328 is normal to base deck planar bearing surface 76 and facing forward. In the embodiment, front deck portion 322 includes a locking pin 332 engageable with hinge joint 334 to lock front deck portion 322 in the first or second position and a front deck aperture 336 to access the locking pin 332, the aperture 336 disposed to align with locking pin 332 when front deck portion 322 is in the second position.

Figure 28:
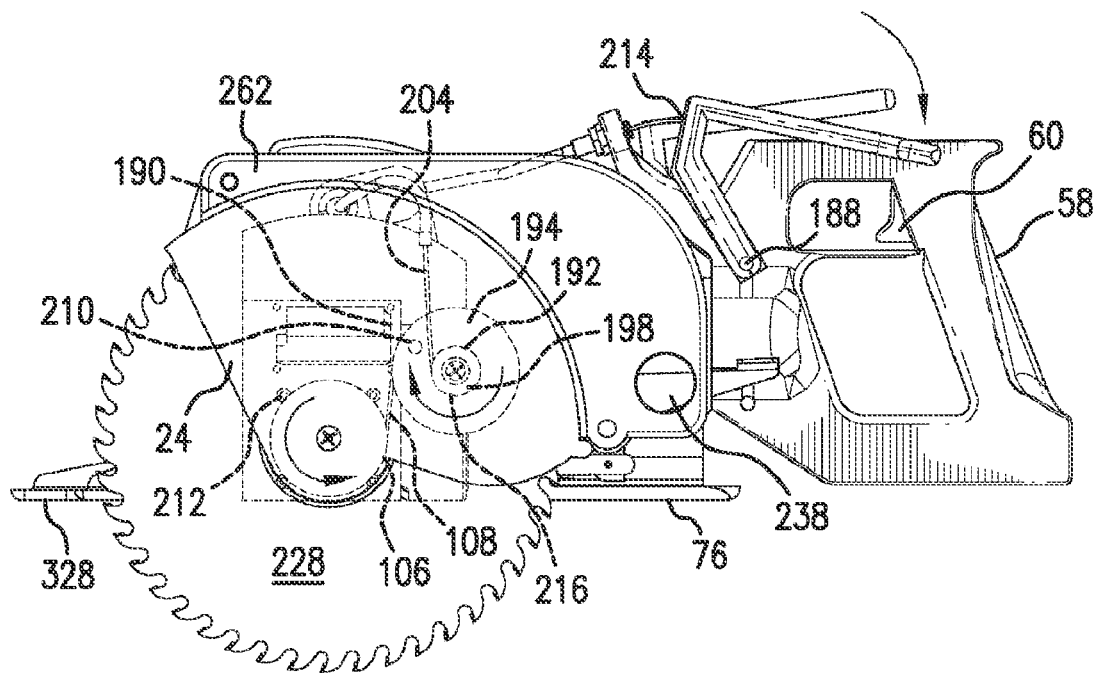
FIG. 28 shows a left side view of a first embodiment indicating lower blade shield operation.
Figure 29:
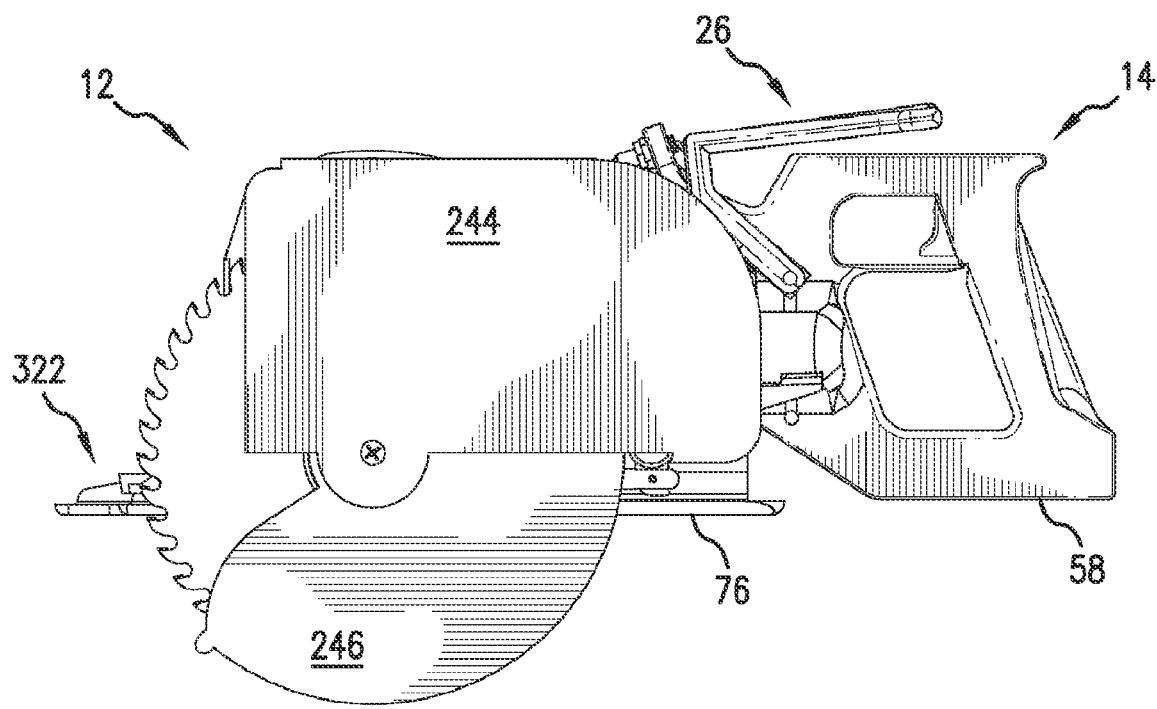
FIG. 29 shows left side view of a first embodiment with dust cover installed.
Figure 30:
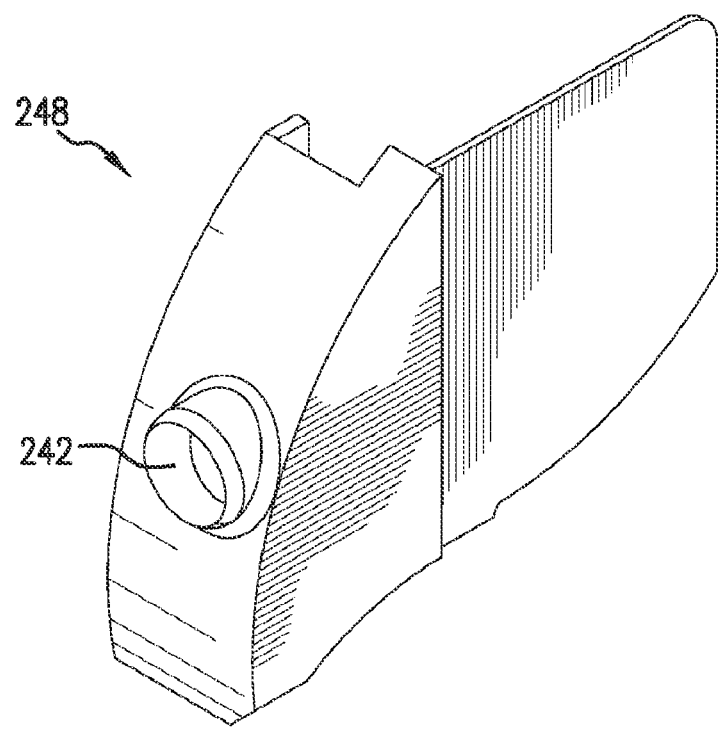
FIG. 30 shows a perspective view of a front cover portion.
Figure 31:
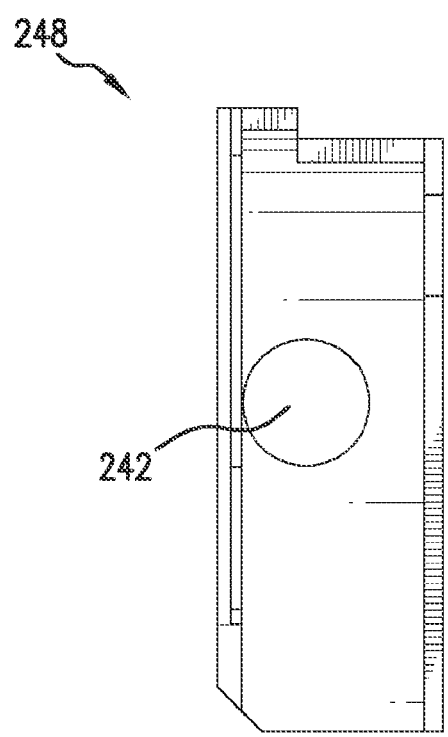
FIG. 31 shows a front view of a front cover portion.
Figure 32:
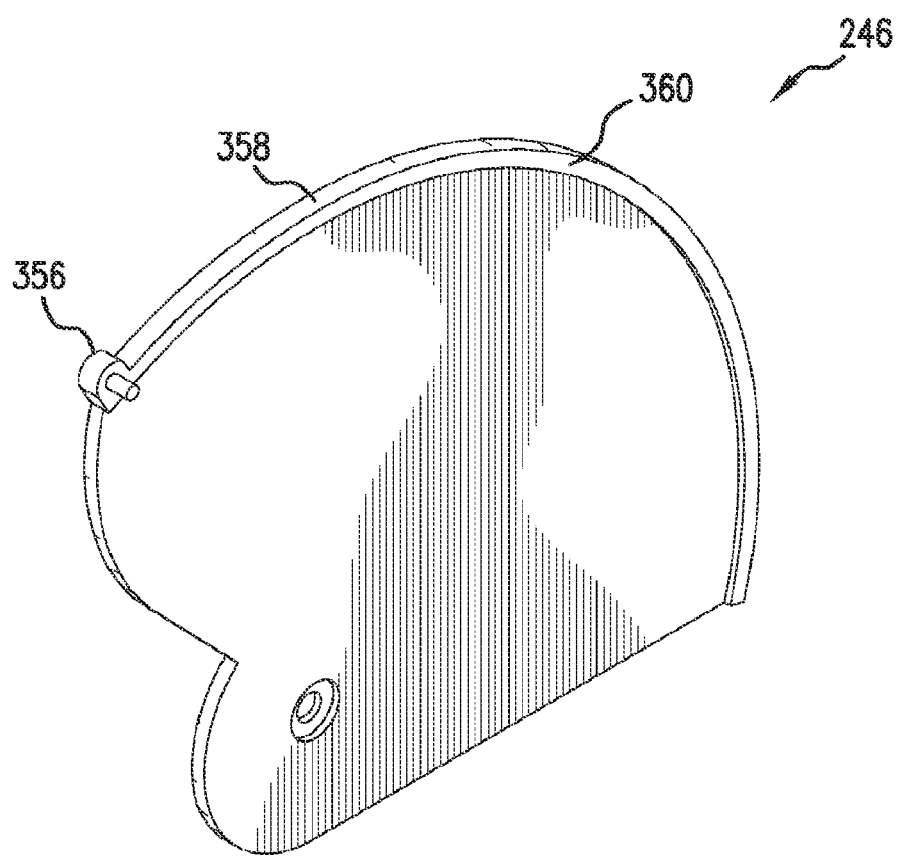
FIG. 32 shows an internal perspective view of a blade cover portion.
Figure 33:
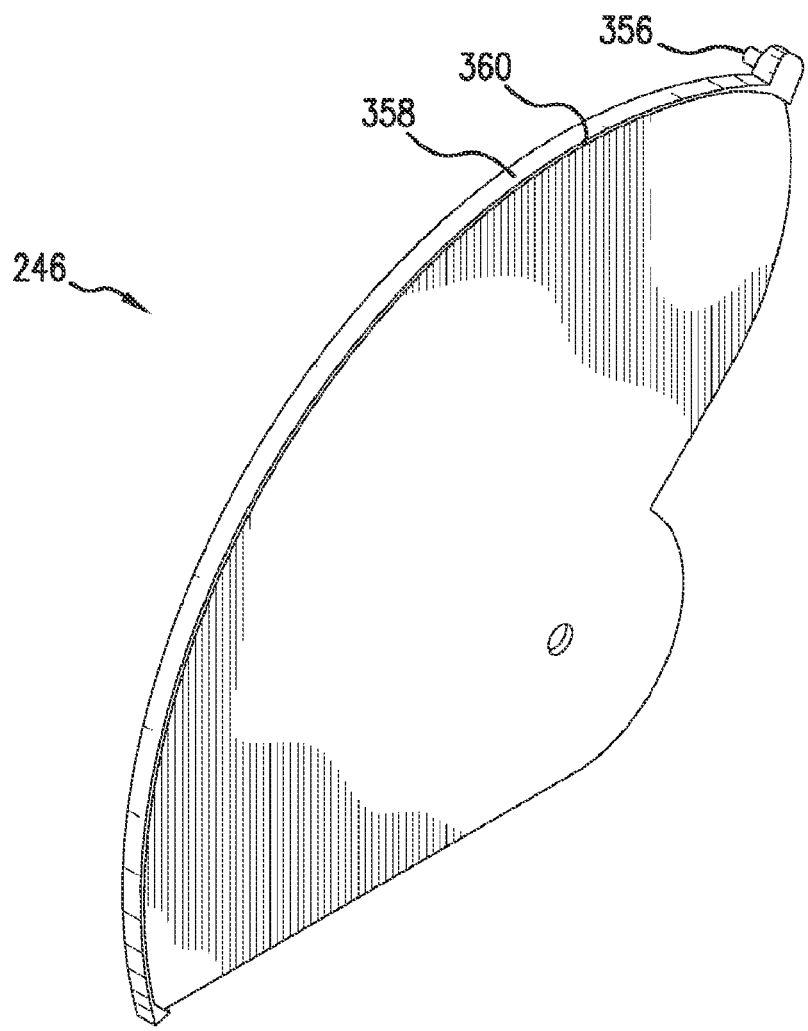
FIG. 33 shows an external perspective view of a blade cover portion.

Lower blade shield 24 is movable between a deployed position (see FIG. 29) and a retracted position (see FIG. 28). Lower blade 24 shield includes an arcuate laterally projected sidewall 92 circumscribing a portion of blade arc 50 from a side wall first end 94 to a sidewall second end 96, the arcuate sidewall 92 including a facing edge 98 which is approximately coplanar with blade deck bearing surface 64. Lower blade shield 24 is rotatably coupled to blade shield axle 44, coaxial to drive shaft 36. Lower blade shield 24 is movable between a deployed position, shown in FIGS. 6, 29, circumscribing a substantial portion of the projecting blade arc 50, and a retracted position, as shown in FIG. 28, circumscribing essentially no portion of the projecting blade arc 50. The projecting blade arc refers to the portion of the blade arc 50 extending distally past base deck 22 and forward of the saw motor frame portion 16, which will vary depending on the selected pitch angle. In the embodiment, lower blade shield 24 circumscribes substantially the entire bottom portion of blade arc 50 in the deployed position, such that if saw 10 with blade 48 mounted to the saw 10 were rested on the ground, the blade 48 would not contact the ground.

In the first embodiment, the cross section of the drive shaft 36 defines shaft diameter 122. Blade shield axle 44 is coaxial with and surrounds drive shaft 36, the blade shield axle 44 having an exterior bearing surface 124 defining an exterior blade shield axle diameter 126, the exterior bearing surface 124 to rotatably receive lower blade shield 24 over the blade shield axle 44. Blade shield axle 44 includes an interior bearing surface 128 defining an interior blade shield axle diameter 130 greater than the drive shaft diameter 122.

Arbor 28 includes a first part 132 having a hollow axle 134 to couple over drive shaft 36 and within shield axle interior bearing surface 128, and a second part 136 extending from the first part 132, the second part including a flange 138 having the first mounting face 46. Blade shield axle interior bearing surface 128 is adapted to rotatably receive arbor first part 132. In the first embodiment, the diameter of arbor flange 138 is greater than blade shield axle outer shaft diameter 124 to retain blade shield 24 on blade shield axle 44. Blade shield frustum 86 flares out to provide clearance for arbor 28 and arbor flange 138, In the embodiment, an arbor cap 338 is provided to engage blade 48 to arbor 28, and thereby to drive shaft 36. Arbor cap 338 includes a blade engagement projection 340 to insert into and engage a center mounting aperture 342 through blade central mounting portion 218; a surrounding flange 344 to go against central mounting portion first surface 220; an arbor cap center aperture 346 to receive a fastener 348 there through; and, a center fastener 348 to engage blade 48 against arbor 28 through arbor cap center aperture 342. In the embodiment, center fastener 348 is a threaded bolt threading directly into the end of drive shaft 36 to compress blade central mounting portion 218 against arbor first mounting face 46 to couple blade 48 to drive shaft 36. Arbor cap 338 has a depth 350 dimensioned such that with arbor cap 338 engaged against blade 48, arbor cap 338 does not protrude past blade cutting portion first planar surface 228 to facilitate flush cuts. In the embodiment, blade engagement projection 340 is diamond shaped to engage diamond shaped blade center mounting aperture 342, but other shapes may be used.

Lower blade shield 24 includes front side 100 and opposed back side 102, journal bearing portion 84 with internal journal bearing surface 104 to go receive blade shield axle 44, and external sheave 106 surrounding journal bearing portion 84 to receive a cable. Blade shield axle 44 provides rotating bearing surface for blade shield journal bearing 84, and receives the arbor shaft 134 into an internal journal bearing 128 (the interior bearing surface of blade shield axle 44) so as to stabilize drive shaft 36 and blade 48 during rotation.

First lower blade shield trigger 26 is operably coupled to lower blade shield 24 to move lower blade shield 24 between the normal deployed position and the retracted position. In the first embodiment, first trigger 26 is a lever arm having a first leg 140 extending from a first end 142 connected to a pivot axle 206 to a second end 144, and a second leg 146 extending from first leg second end 144 to a second end 148, with a finger tab 150 disposed at second leg second end 148. First lower blade shield trigger 26 is disposed along a first lateral side 152 of the handle portion 18 proximal to motor actuator 60 such that it may be operated by a first thumb of an operator while gripping the hand grip 58.

In the embodiment, a second lower blade shield trigger 154 is operably coupled to the lower blade shield 24 to move the lower blade shield 24 between the normal deployed position and the retracted position. Second lower blade shield trigger 154 is disposed along the opposed lateral side 156 of the handle portion 18 from the first lower blade shield trigger 26 proximal to the motor actuator 60 such that it may be operated by the opposing thumb of an operator while gripping the hand grip 58 with the opposing hand. In the embodiment, second lower blade shield trigger 154 is a lever arm having a first leg 158 extending from a first end 160 connected to a pivot axle 208 to a second end 162, and a second leg 164 extending from first leg second end 162 to a second end 166, with a finger tab 168 disposed at second leg second end 164.

In the embodiment, center lever 202 is disposed between first and second lower blade shield triggers 26 and 154, to provide independent operation. Center lever 202 includes a transversely oriented bridge portion 170, first and second legs 172 and 174, respectively, extending from opposing ends 176 and 178 of bridge portion 170 to first and second leg ends 180 and 182, respectively, and opposed first and second tabs 184 and 186, respectively, extending laterally from the bridge portion opposed ends 176 and 178, respectively, the center lever first and second legs 172 and 174 pivotably coupled at first and second leg ends 180 and 182 to the handle portion 18 coaxially to the first and second lower blade shield triggers 26 and 154 on a sixth transvers axis 188. First and second tabs 184 and 186 overlap first and second lower blade shield triggers 26 and 154, respectively, such that either first or second trigger 26 or 154 will engage against its respective tab 184 or 186 to move the center lever 202 when the respective trigger 26 or 154 is depressed. Double pulley 190 is rotatably coupled to the motor frame portion first lateral 38 side at a fifth transverse axis 192, the double pulley 190 including a first sheave 194 having a first diameter 196 and a second sheave 198 having a second diameter 200, the second diameter 200 smaller than the first diameter 196. First cable 204 operatively couples center lever 202 to first sheave 194; and, second cable 108 couples second sheave 198 to lower blade shield 24 around lower blade shield sheave 106, as described previously.

Lower blade shield triggers 26 and 154 are operably coupled to double pulley 190 by first cable 204 coupled at a first end 214 to center lever 202 and wrapped around double pulley second sheave 198 at a second end 216. Lower blade shield 24 is operatively coupled to double pulley 190 by second cable 108. Second cable 108 has a first end 210 wrapped around double pulley second sheave and a second end 212 wrapped around sheave 106, with a terminal end 110 coupled to anchor block 112. A bias spring 114 is coupled at a first end 116 to the motor frame portion 16 and at a second end 118 to blade shield 24 in order to bias lower blade shield 24 to the deployed position.

Lower blade shield triggers 26, 154 moving independently of each other allows ambidextrous use, wherein operating one trigger will not bring the other trigger down in contact with the hand. The lower blade shield 24 pulley and cable system permits locating the operating parts virtually anywhere on the saw 10, and provides the ability to use a rotatable handle portion 28, rather than the direct lever couplings common in existing devices. Dual pulley sheaves 194, 198 provide large shield movement for a small trigger movement, due to greater diameter of the inner sheave 196. Second cable 108 a distributes out of axis force substantially around the perimeter of lower blade shield journal bearing portion 84, thereby reducing trans-axial stress on the shield 24 and shaft 44, which lessens the likelihood of binding.

Referring to FIGS. 8, 9, 11, 12 and 14, an offset circular saw blade 48 of a first embodiment 10 is shown. Saw blade 48 is removably mountable to a zero clearance circular saw 10 having motor 34 coupled to drive shaft 36, a blade deck 20 including planar bearing surface 64, and first mounting face 46 coupled to drive shaft 36. The distance from the first mounting face 46 to blade deck bearing surface 64 defines blade offset depth 66. Blade 48 includes central mounting portion 218 and a cutting portion 226 extending outward from central mounting portion 218. Central mounting portion 218 has opposed first and second surfaces 220 and 222, the central mounting portion second surface 222 including second mounting face 224 adapted to mate to first mounting face 46. Cutting portion 226 has opposed first and second planar surfaces 228 and 230 extending from the central mounting portion 218 to a cutting edge 232 disposed along the blade perimeter 234. In the embodiment, saw blade 48 is a unidirectional toothed saw blade so the cutting edge 232 corresponds to the teeth 52 disposed along the perimeter. Blade perimeter 234 corresponds to or is coextensive to blade arc 50, as the rotation of cutting edge 232 defines the blade arc 50. In the embodiment, blade central mounting portion 218 is offset laterally from blade cutting portion second surface 230 and the distance from second mounting face 224 to blade cutting portion first planar surface 228 is equal to blade offset depth 46, such that blade cutting portion first planar surface 228 is coplanar to blade deck planar bearing surface 64 when mounted to saw 10.

Second hand grip 352 is provided, oriented transversely, to permit two-handed operation for increased stability. Second hand grip 352 also provides a secure routing path for first cable 204. First cable 204 runs through a protective cable sheath 354 to second hand grip 352.

Referring to FIGS. 2, 8 and 29-33, a dust cover 240 of a first embodiment is shown. Dust cover 240 is removably couplable to saw 10 to substantially enclose blade arc 50 in order to contain much of the dust generated by cutting. Dust cover 240 includes exhaust port 242 to connect to a dust collection system, for example a shop vacuum cleaner or facility exhaust. In the embodiment, dust cover 240 includes an aft cover portion 244, a lower blade cover portion 246, and a front cover portion 248. Aft cover portion 244 is removably mountable to blade deck 24 by snapping over the upper and aft portion of blade deck 24 and covers a portion of blade 48 mounted to saw 10. Lower blade cover portion 246 is removably mountable to the lower blade shield 24 using snap fitting 356, with matching sidewall and edge face 358 and 360, respectively, to mate against, blade shield edge face 98, and rotatably coupled to the aft cover portion 244, the rotatable coupling connector 250 coaxial with the first transverse axis 40, such that lower blade cover portion 246 moves with lower blade shield 24 between the deployed and retracted positions. Front cover portion 248 is removably mountable to base deck 22 proximal base deck forward edge 68 and movable with base deck 22. In the embodiment, forward cover portion 248 snaps over hinge block 252 to move with hinge block 252, which in turn is coupled to and moves about second transverse axis 78 with base deck 22.

Figure 13:
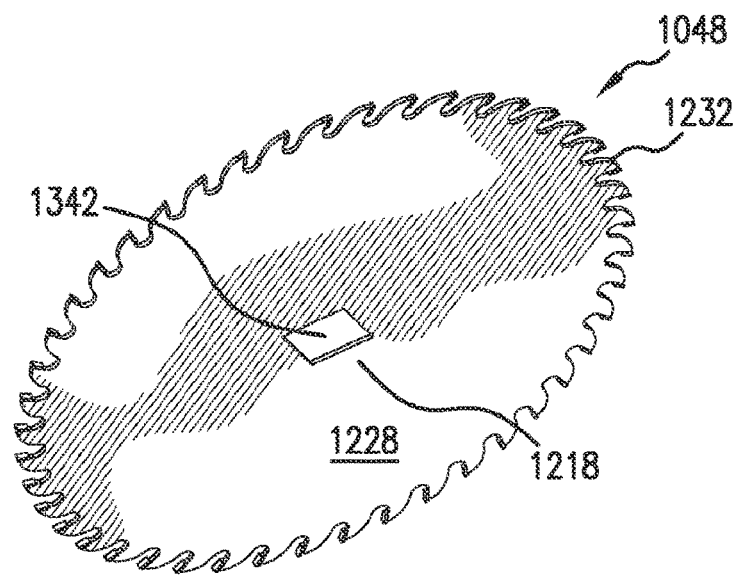
FIG. 13 shows a perspective view of a flat blade of a second embodiment.
Figure 14:
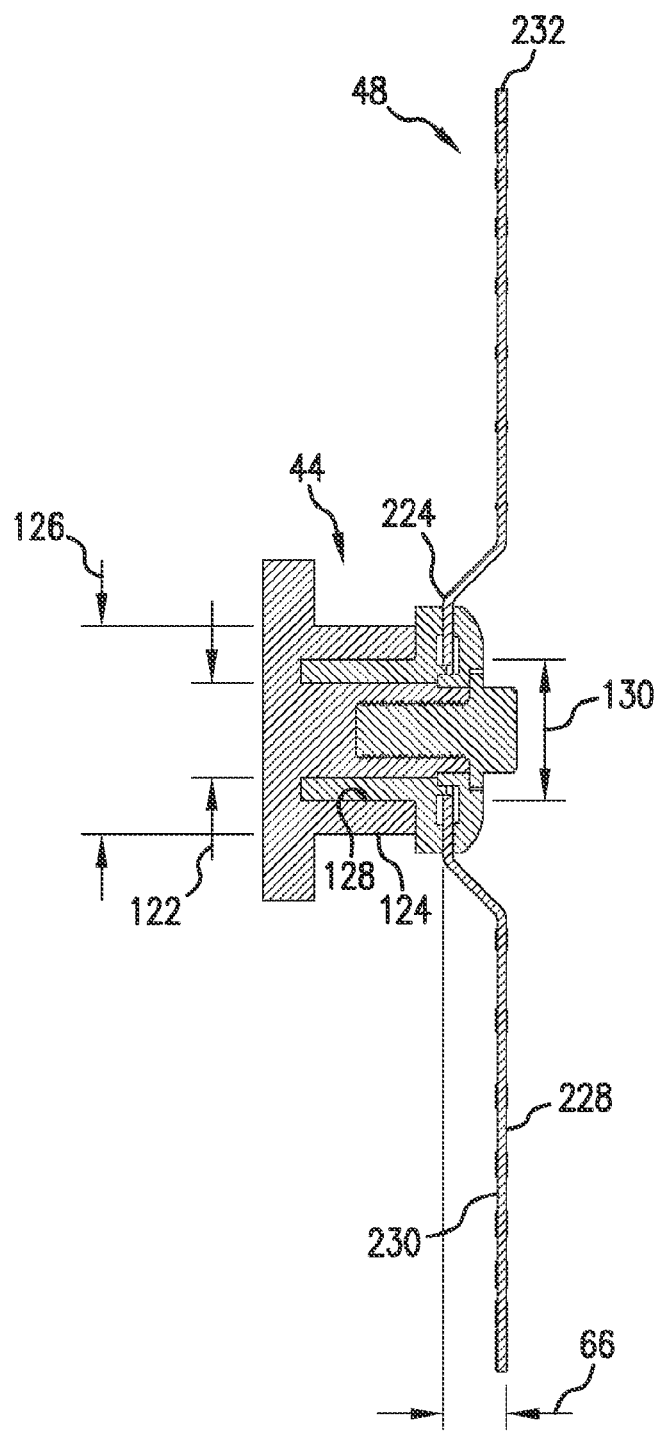
FIG. 14 shows a cutaway side view of a blade mounting assembly.
Figure 15:
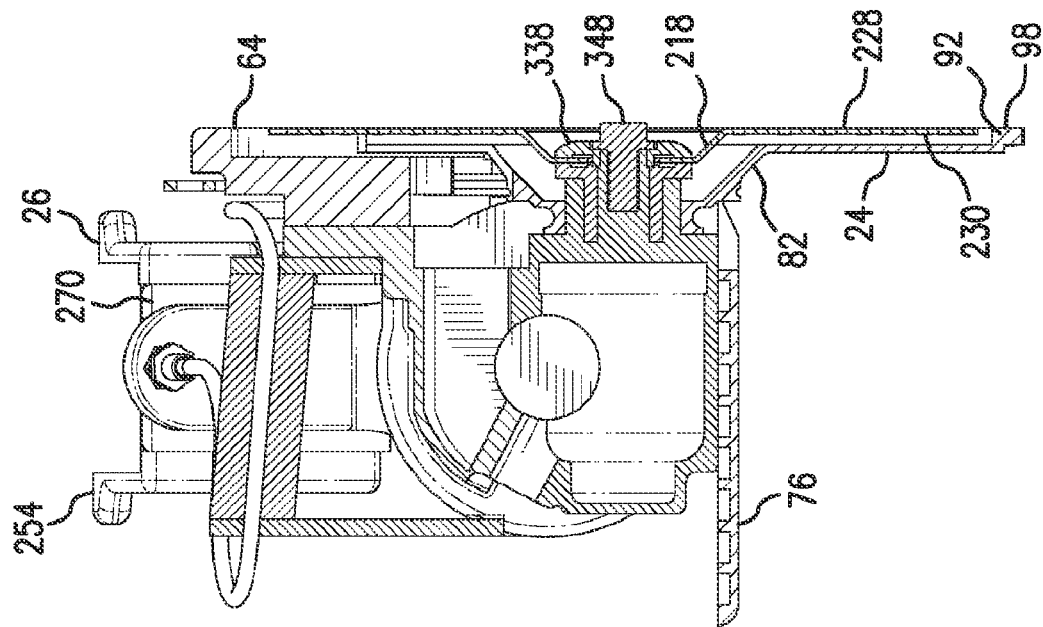
FIG. 15 shows a cutaway front view of a flush mount blade assembly.
Figure 16:
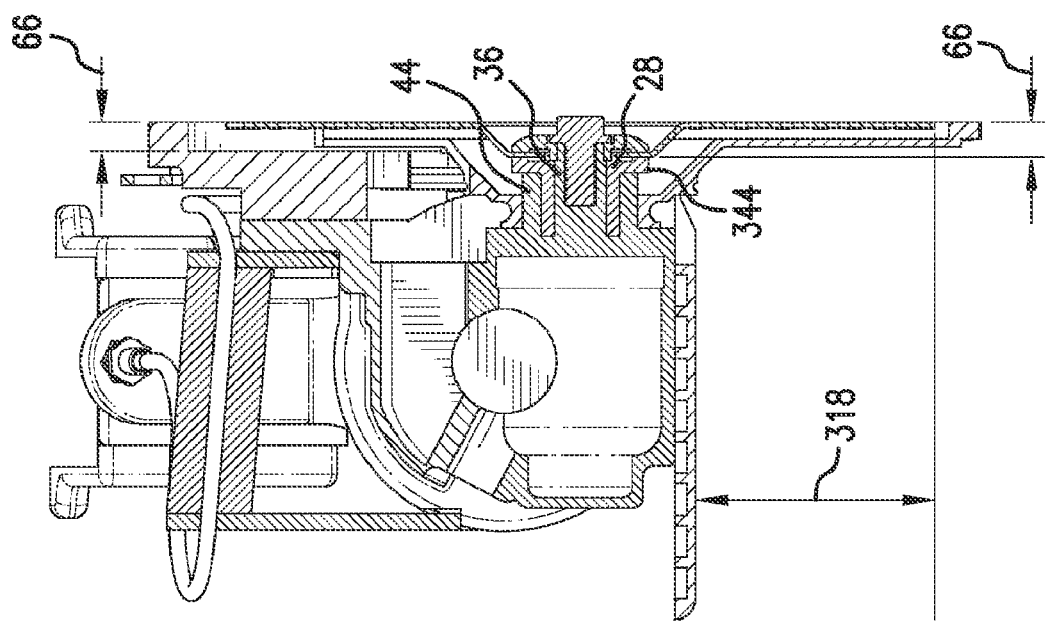
FIG. 16 shows a second cutaway front view of a flush mount blade assembly.
Figure 17:
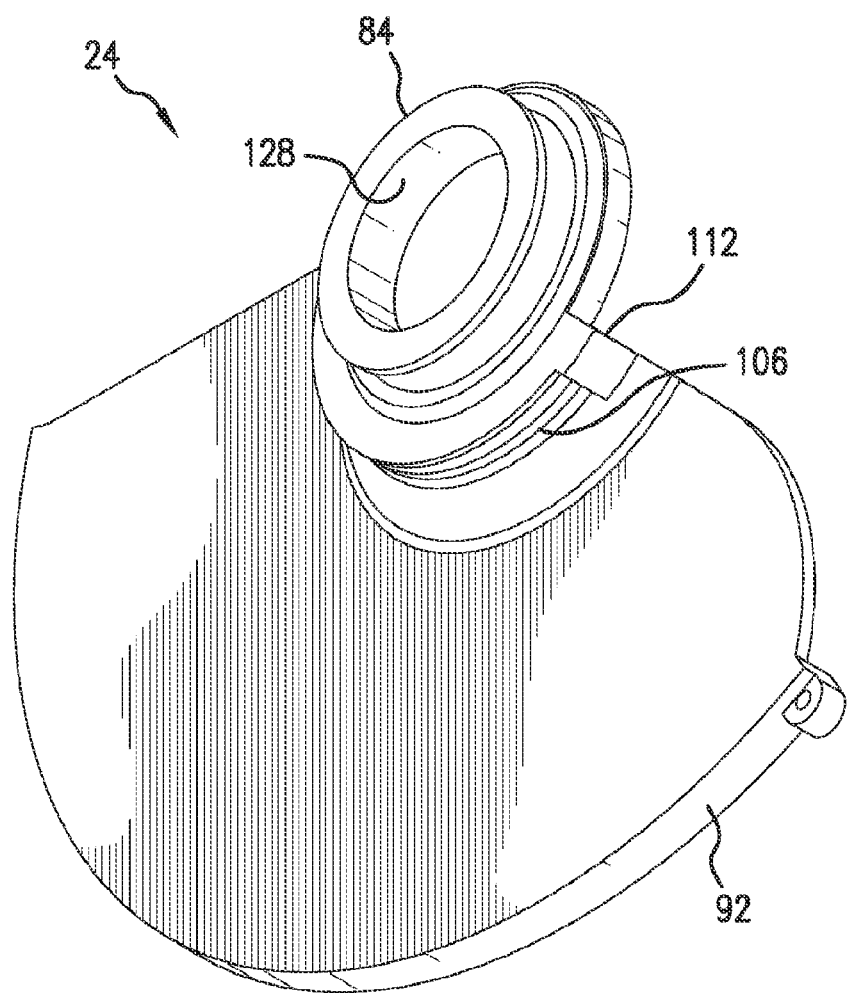
FIG. 17 shows a perspective view of a lower blade shield back side.
Figure 18:
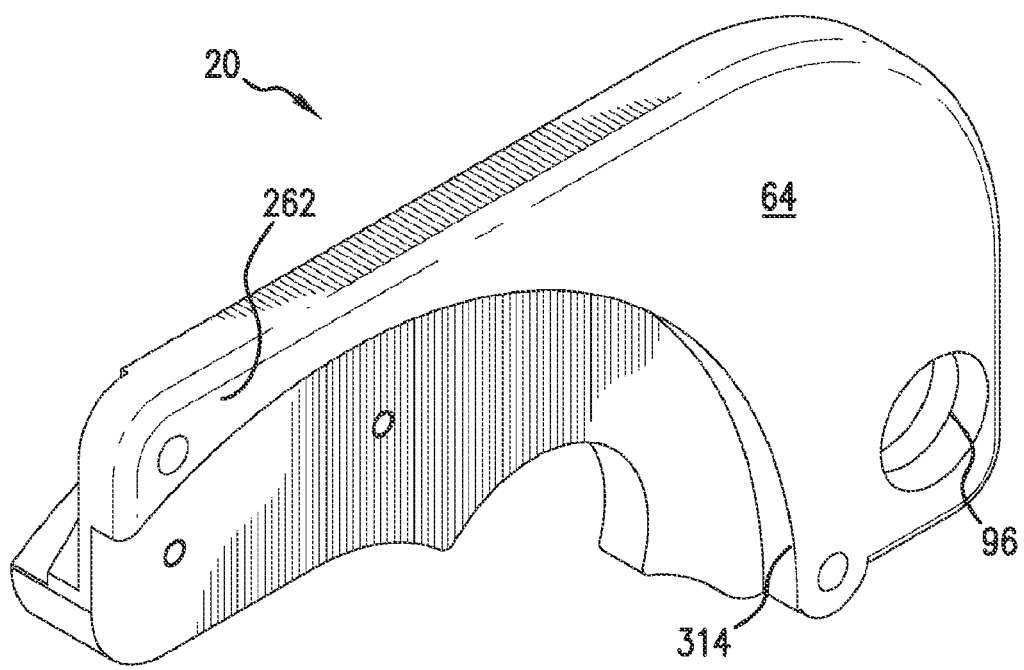
FIG. 18 shows perspective view of a blade deck.
Figure 19A:
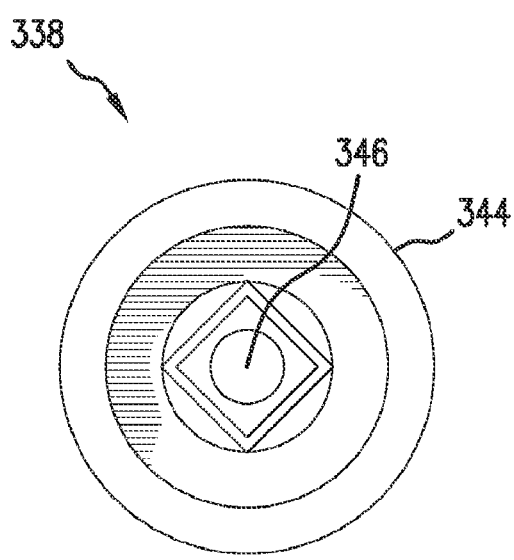
FIG. 19A shows a plan view of an arbor cap.
Figure 19B:
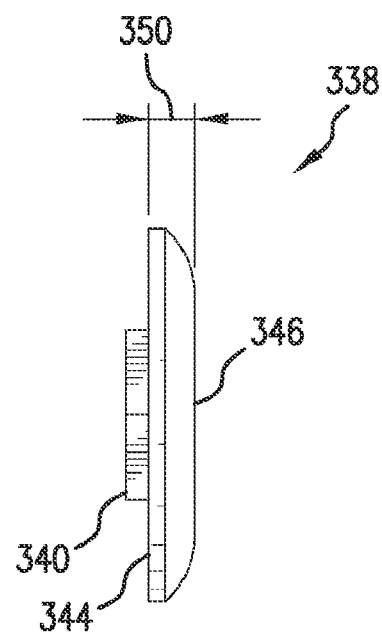
FIG. 19B shows a side view of an arbor cap.
Figure 20:
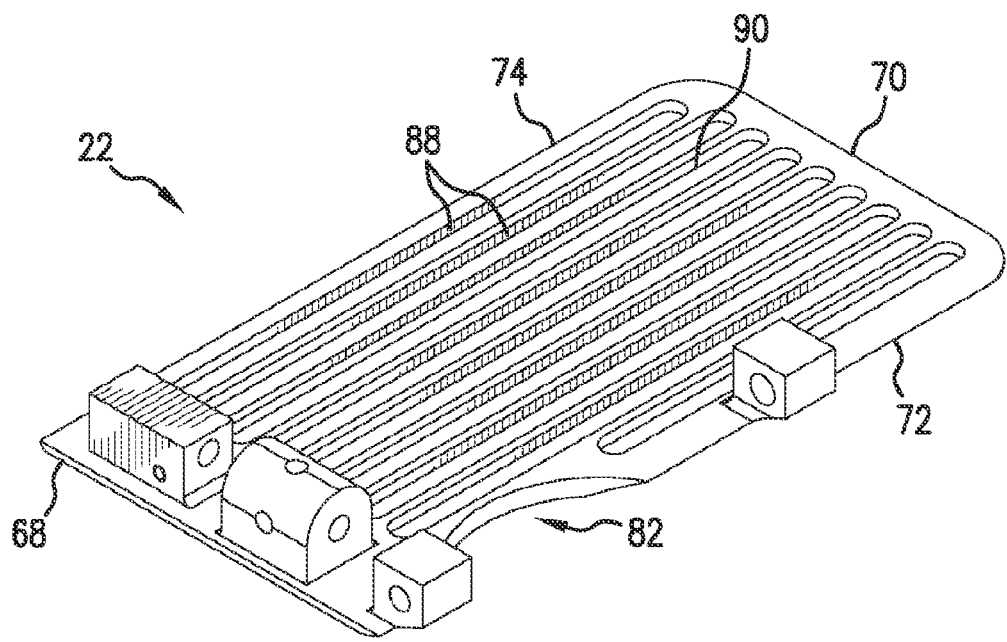
FIG. 20 shows a perspective view of a base deck.
Figure 21:
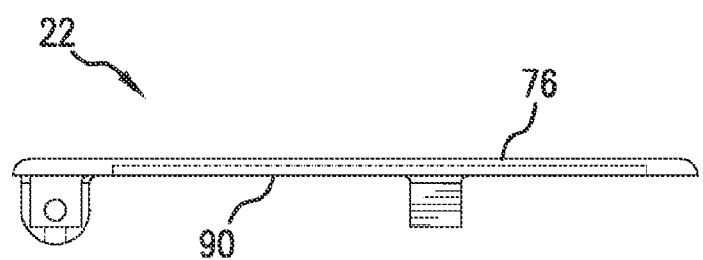
FIG. 21 shows side view of a base deck.
Figure 22:
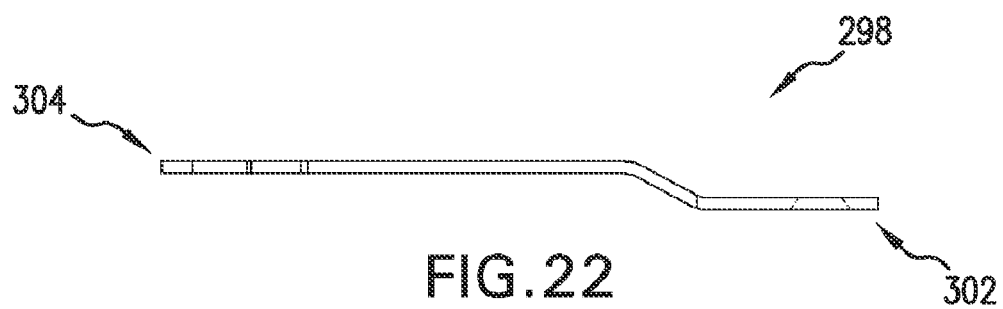
FIG. 22 shows a side view of a second sliding connector first part.
Figure 23:
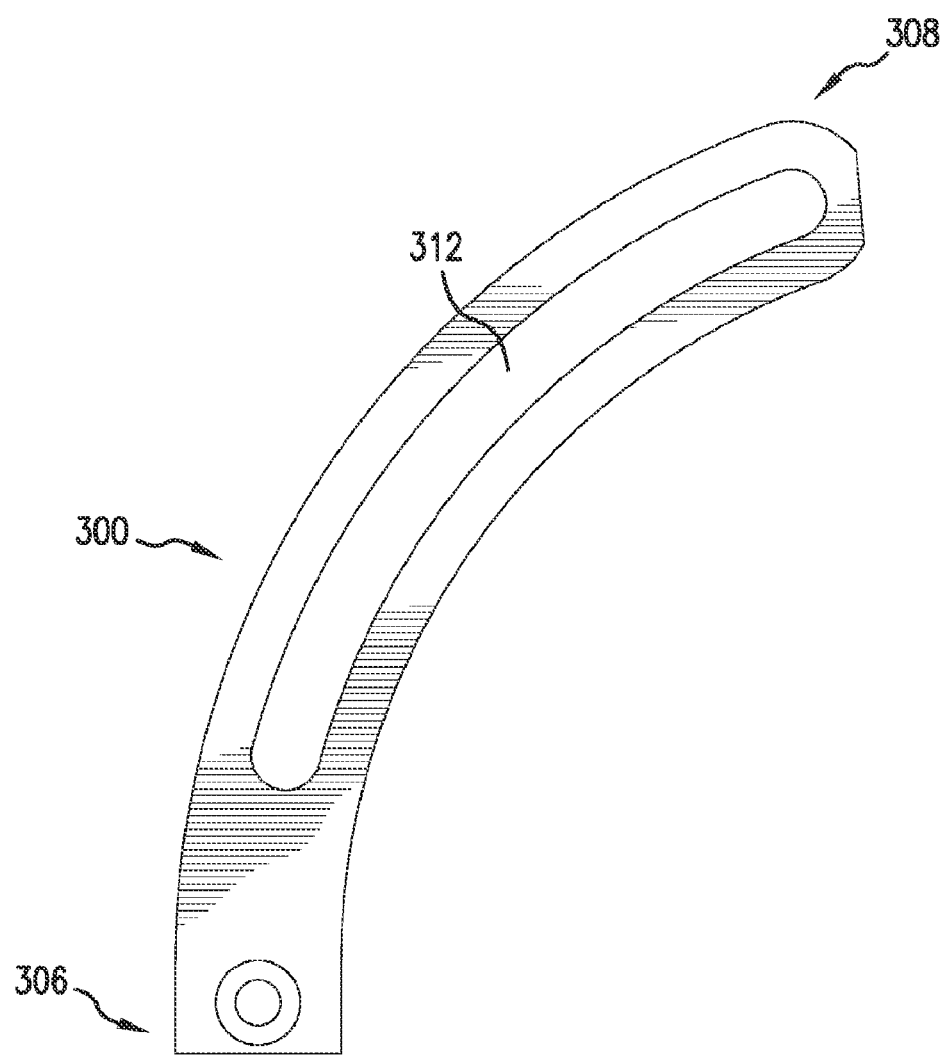
FIG. 23 shows a plan view of a second sliding connector second part.
Figure 24:
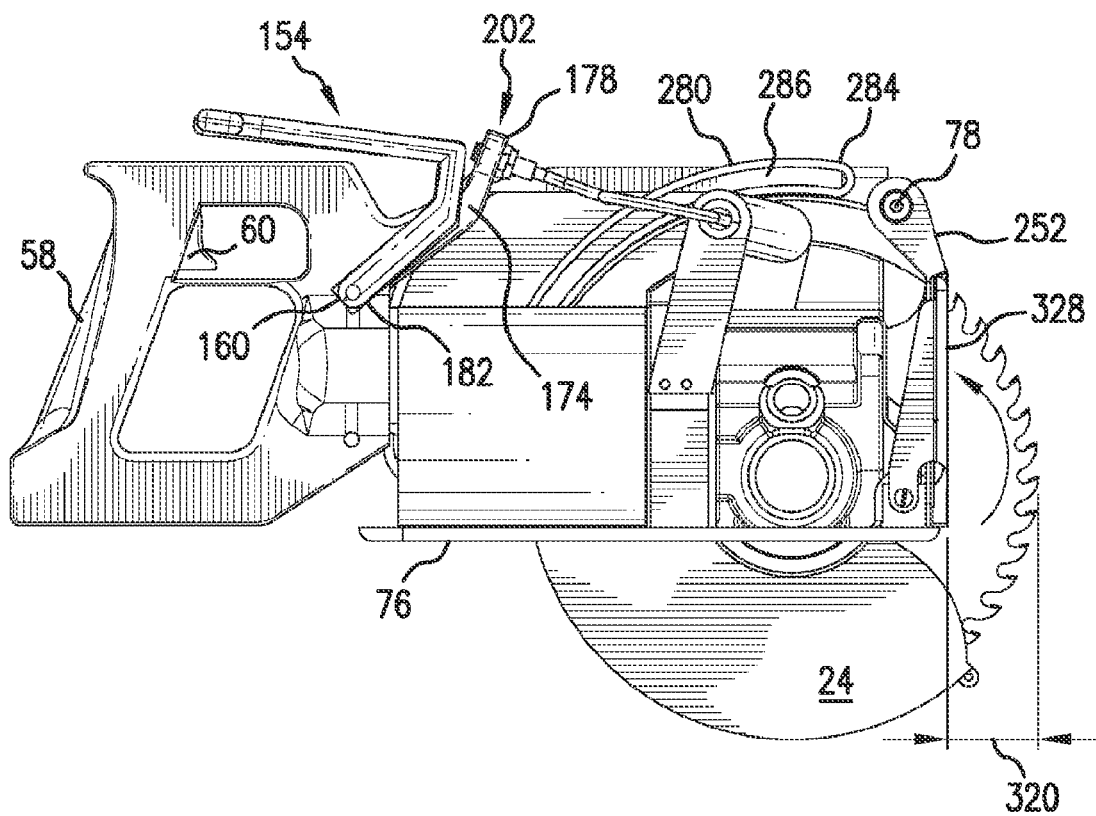
FIG. 24 shows a side view of a first embodiment with front deck portion retracted.
Figure 25:
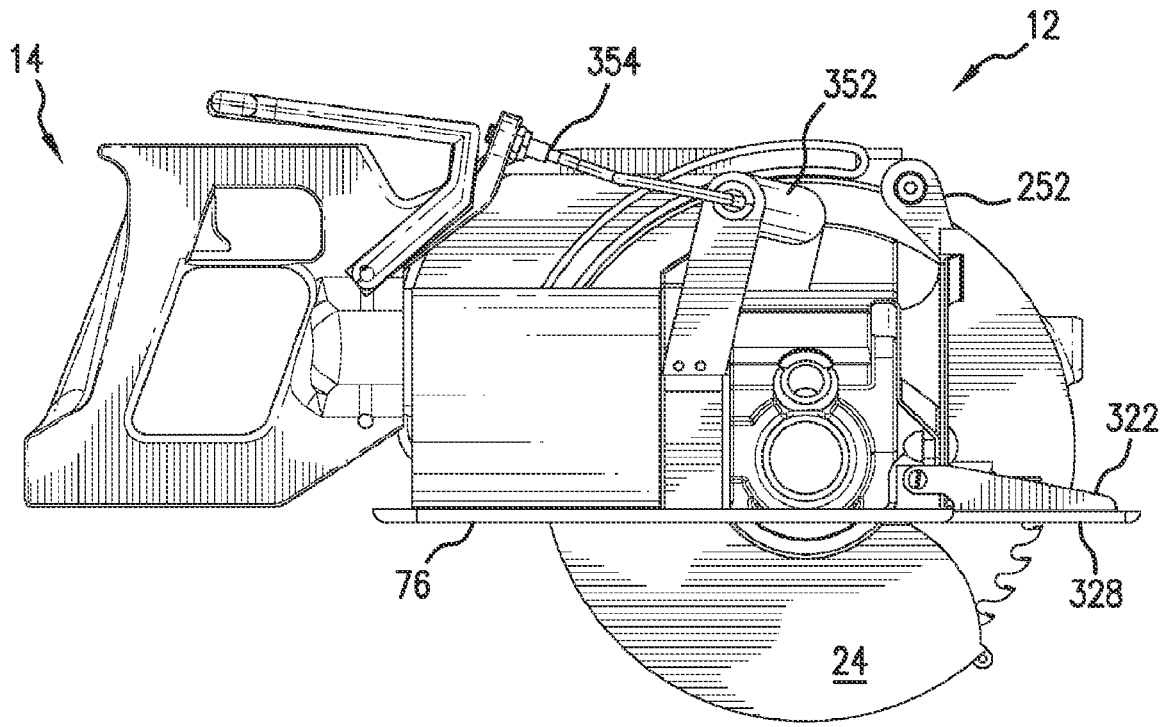
FIG. 25 shows right side view of a first embodiment with front deck portion extended and dust cover installed.
Figure 26:
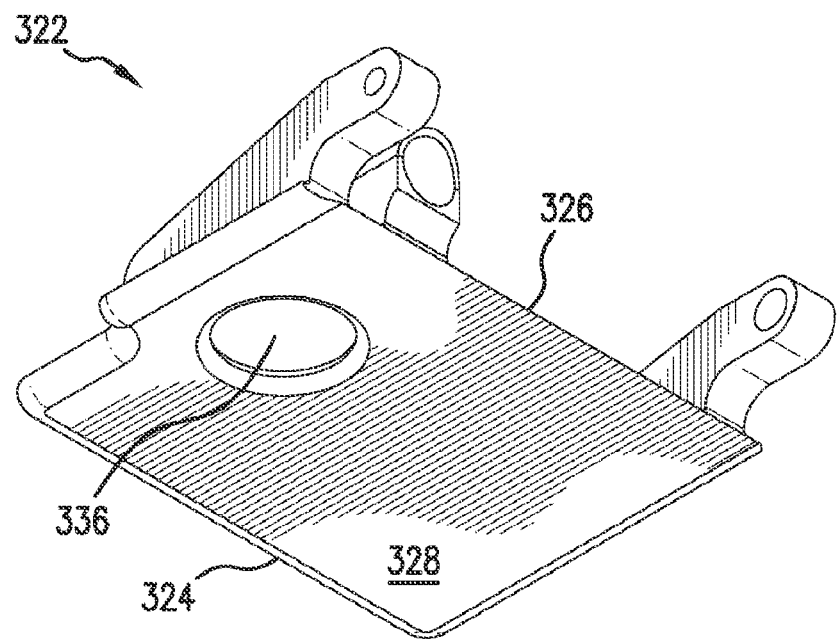
FIG. 26 shows bottom perspective view of a front deck portion.
Figure 27:
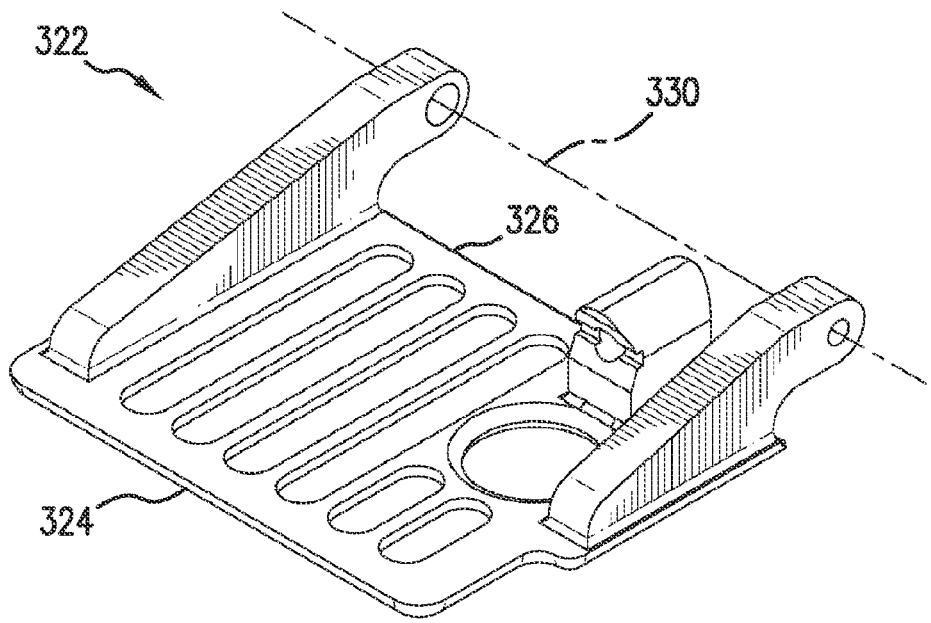
FIG. 27 shows top perspective view of a front deck portion.
Figure 34:
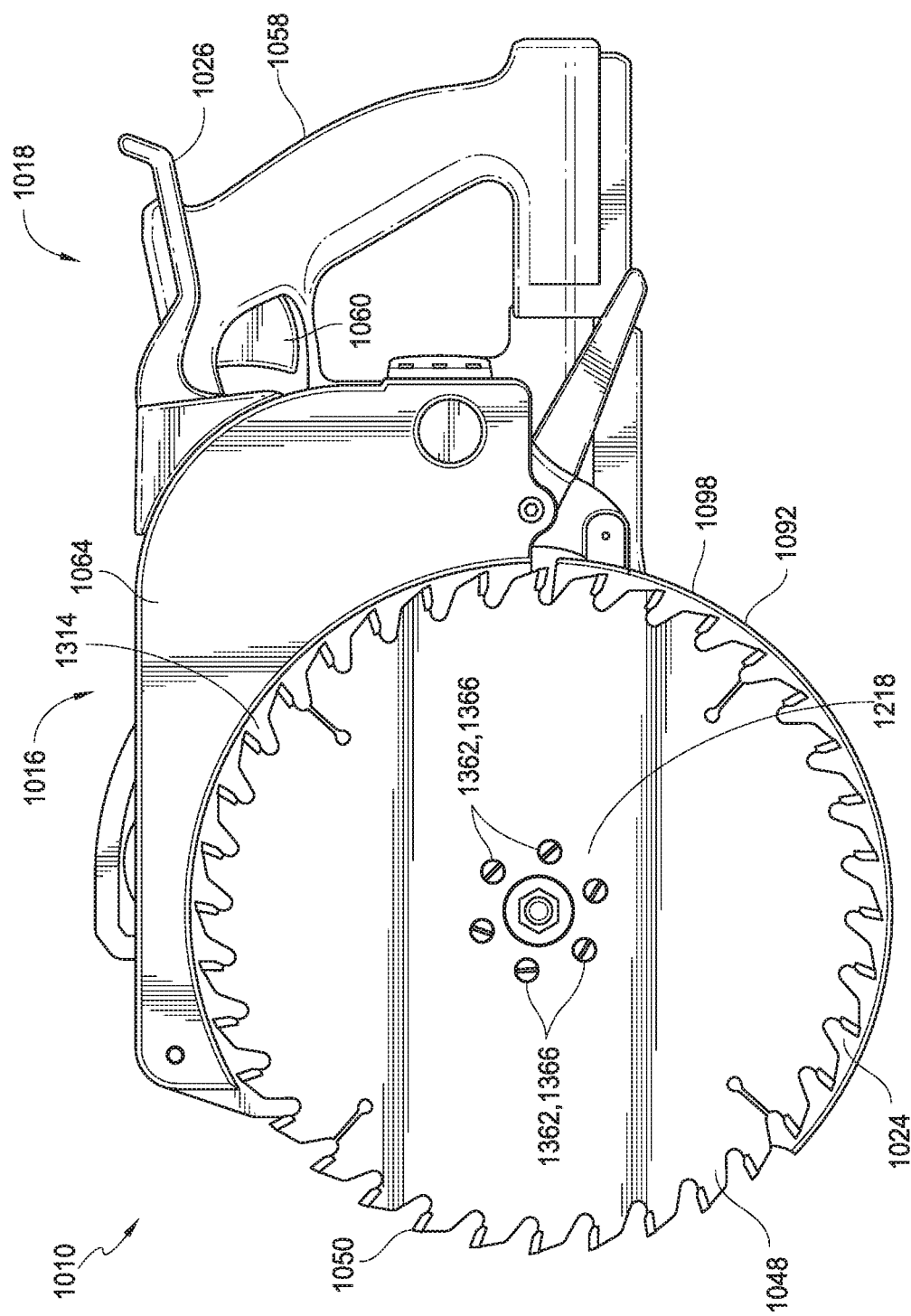
FIG. 34 shows a side view of a second embodiment.

Referring to FIGS. 13 and 34, a second embodiment 1010 is shown, generally similar to the first embodiment but having a handle portion 1018 rigidly coupled to the motor frame portion 1016, and providing only a first blade shield trigger 1026, in the second embodiment, a flat blade 1048 is mounted flush to blade deck planar bearing surface 1064, through a first plurality of mounting apertures 1362 having countersunk bevels on a first blade cutting portion planar surface 1228, using bevel head fasteners 1366. Blade 1048 may include a second plurality of mounting apertures having bevels on an opposed cutting portion planar surface 1230 to make blade reversible. This arrangement allows for a reversible blade. Generally, blade cutting edges have unidirectional cutting teeth, but some blades may have bidirectional cutting edges, for instance simple triangular teeth, or blades that have a thin grinding edge for a cutting edge, rather than teeth. Reversible blade may be desirable to extend blade life, or to prevent incorrect mounting (i.e. "idiot proofing").

In the second embodiment, the saw 1010 is adapted to mount a flat blade 1048 flush for zero clearance cuts. In this regard, flat blade means the blade depth 1066 is equal to the blade thickness. Arbor 1028 includes a plurality of fastener receiving holes 1360; the blade central mounting portion 1218 having a having a first plurality of mounting apertures 1362, the first plurality of mounting apertures 1362 countersunk 1364 on the mounting portion first surface 1222, the first plurality of mounting apertures 1362 corresponding to the fastener receiving holes 1360; and, a plurality of bevel head fasteners 1366 to engage the blade 1048 to the arbor 1028 through the first plurality of mounting apertures 1362 and fastener receiving holes 1360, the fastener heads 1368 flush with the mounting portion second surface when fully engaged through the first plurality of mounting apertures 1362.

In the embodiment, the blade central mounting portion may also include a second plurality of mounting apertures, the second plurality of mounting apertures countersunk on the mounting portion second surface, the second plurality of mounting apertures corresponding to the fastener receiving holes the plurality of fasteners engagable through the second plurality of mounting apertures to be flush with the central mounting portion second surface, such that the blade is reversible.

Using the first embodiment 10 as an example, in operation a blade 48 is mounted onto a saw 10 by fastening a center fastener 348 through the center mounting aperture 346 thread into drive shaft 36, thereby compressing blade second mounting face 224 against arbor first mounting face 46. Arbor 28 is rotatingly engaged to drive shaft 36, and so rotates with the drive shaft, stabilized within lower blade shield axle 44. To make a flush cut, the operator lays the saw blade first planar surface 228 against the flat surface to be cut to, supported by coplanar with blade deck planar bearing surface 64 and blade shield sidewall edge face 98, actuates the motor using actuator 60, retracts the lower blade shield 24 by compressing first or second shield trigger 26 or 154, and drives the rotating saw blade 48 into the material. If the operator first locks forward deck portion 322 into the second position, then the operator may continue the cut through 360°. For example, the operator may cut continuously along a floor-wall interface, continuing up the far wall, along the ceiling, and back down the near wall.

Alternatively, the operator may rotate handle portion 18 by 90° to lay the blade 48 and planar bearing surface 64 horizontal for use as an undercut or "jam" saw.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

The invention claimed is:

1. A portable circular saw, comprising:
a motor-frame portion extending along a longitudinal axis from an aft end to a forward end, wherein the motor-frame portion includes
 a motor, and
 a drive shaft operably coupled to the motor, wherein the drive shaft extends perpendicular to the longitudinal axis;
a handle portion rotatably coupled to the aft end of the motor frame portion, wherein the handle portion is rotatable about the longitudinal axis;
an arbor coupled to the drive shaft, wherein the arbor is configured to receive and mount a saw blade thereon;
a base deck mounted to the motor frame portion, wherein the base deck is adjustable to set a bevel angle and a pitch angle; and
a front deck portion rotatably mounted to the base deck, wherein, when the saw blade is mounted on the arbor, the front deck portion is rotatable from a first position with the front deck portion parallel to the base deck and extending forward along the longitudinal axis beyond the saw blade, to a second position with the front deck portion perpendicular to the base deck and the saw blade extending past the front deck portion for plunge cutting.

2. A portable circular saw, comprising:
a motor frame portion having a motor, wherein the motor frame portion extends along a first axis from an aft end to a forward end;
a drive shaft extending from the motor and configured to receive an arbor to couple a saw blade having a planar surface to the drive shaft;
a handle portion having a hand grip, wherein the handle portion is rotatably coupled to the aft end of the motor frame portion;
a base deck rotatably coupled to the motor frame portion about a second axis to set a bevel angle, and about a third axis to set a cutting depth;
a blade deck coupled to the motor frame portion and having a planar bearing surface, wherein, when the saw blade is coupled to the drive shaft via the arbor, the planar surface of the saw blade is coplanar with the planar bearing surface of the blade deck, and wherein the handle portion is rotatable to position the hand grip perpendicular to the planar bearing surface of the blade deck; and
a front deck pivotally coupled to the base deck adjacent the forward end of the motor frame portion, wherein the front deck is movable from a first position parallel to the base deck, to a second position perpendicular to the base deck, and wherein, when the saw blade is coupled to the drive shaft and the front deck is in the second position, a portion of the saw blade extends beyond the front deck and the base deck in a forward direction along the first axis.

* * * * *